United States Patent
Liu et al.

(10) Patent No.: US 9,164,983 B2
(45) Date of Patent: Oct. 20, 2015

(54) BROAD-COVERAGE NORMALIZATION SYSTEM FOR SOCIAL MEDIA LANGUAGE

(71) Applicant: Robert Bosch GmbH, Stuttgart (DE)

(72) Inventors: Fei Liu, Palo Alto, CA (US); Fuliang Weng, Mountain View, CA (US)

(73) Assignee: Robert Bosch GmbH, Stuttgart (DE)

(*) Notice: Subject to any disclaimer, the term of this patent is extended or adjusted under 35 U.S.C. 154(b) by 332 days.

(21) Appl. No.: 13/779,083

(22) Filed: Feb. 27, 2013

(65) Prior Publication Data

US 2013/0173258 A1 Jul. 4, 2013

Related U.S. Application Data

(63) Continuation-in-part of application No. 13/117,330, filed on May 27, 2011.

(60) Provisional application No. 61/603,483, filed on Feb. 27, 2012.

(51) Int. Cl.
G06F 17/28 (2006.01)
G06F 17/22 (2006.01)
G06F 17/27 (2006.01)

(52) U.S. Cl.
CPC ............ *G06F 17/28* (2013.01); *G06F 17/2217* (2013.01); *G06F 17/273* (2013.01); *G06F 17/276* (2013.01)

(58) Field of Classification Search
None
See application file for complete search history.

(56) References Cited

U.S. PATENT DOCUMENTS

| | | | |
|---|---|---|---|
| 5,634,084 A | 5/1997 | Malsheen et al. |
| 5,949,961 A | 9/1999 | Sharman |
| 6,003,005 A | 12/1999 | Hirschberg |
| 6,018,735 A | 1/2000 | Hunter |
| 6,173,262 B1 | 1/2001 | Hirschberg |
| 6,173,263 B1 | 1/2001 | Conkie |
| 6,681,208 B2 | 1/2004 | Wu et al. |
| 6,728,700 B2 | 4/2004 | Richards et al. |
| 6,738,738 B2 | 5/2004 | Henton |
| 6,782,505 B1 | 8/2004 | Miranker et al. |
| 6,931,255 B2 | 8/2005 | Mekuria |
| 6,986,104 B2 | 1/2006 | Green et al. |
| 6,999,930 B1 | 2/2006 | Roberts et al. |
| 7,106,836 B2 | 9/2006 | Neuhaus |

(Continued)

OTHER PUBLICATIONS

Spiros Dimopoulos et al.; "Transition features for CRF-based speech recognition and boundary detection"; IEEE workshop on Automatic Speech Recognition and Understanding, 2009 (4 pages).

(Continued)

*Primary Examiner* — Jeremiah Bryar
(74) *Attorney, Agent, or Firm* — Maginot Moore & Beck LLP

(57) ABSTRACT

A method for identification of a standard text token in a dictionary that corresponds to a non-standard token identified in text includes identification of a first standard token that is associated with the non-standard using a predetermined conditional random field (CRF) model and identification of a second standard token that is associated with the non-standard token using a spell checker. The method further includes identification of noisy channel scores using data from the CRF model and the spell checker for the first standard token and the second standard token, respectively. The method further includes presentation of one of the first and second standard tokens having the greatest identified noisy channel score to a user with a user interface device.

13 Claims, 15 Drawing Sheets

(56) References Cited

U.S. PATENT DOCUMENTS

| | | | |
|---|---|---|---|
| 7,116,976 B2 | 10/2006 | Thomas et al. | |
| 7,124,082 B2 | 10/2006 | Freedman | |
| 7,124,083 B2 | 10/2006 | Conkie | |
| 7,136,876 B1 | 11/2006 | Adar et al. | |
| 7,194,684 B1 | 3/2007 | Shazeer | |
| 7,233,901 B2 | 6/2007 | Conkie | |
| 7,483,832 B2 | 1/2009 | Tischer | |
| 7,529,761 B2 | 5/2009 | Wen et al. | |
| 7,552,045 B2 | 6/2009 | Barliga et al. | |
| 7,558,732 B2 | 7/2009 | Kustner et al. | |
| 7,620,549 B2 | 11/2009 | Di Cristo et al. | |
| 7,627,473 B2 | 12/2009 | Gunawardana et al. | |
| 7,689,419 B2 | 3/2010 | Mahajan et al. | |
| 7,689,527 B2 | 3/2010 | Pavlov et al. | |
| 7,711,571 B2 | 5/2010 | Heiner et al. | |
| 7,720,682 B2 | 5/2010 | Stephanick et al. | |
| 7,720,830 B2 | 5/2010 | Wen et al. | |
| 7,783,473 B2 | 8/2010 | Bangalore et al. | |
| 7,890,438 B2 | 2/2011 | Chidlovskii | |
| 8,001,465 B2 * | 8/2011 | Kudrolli et al. | 715/243 |
| 2002/0103834 A1 | 8/2002 | Thompson et al. | |
| 2005/0154979 A1 | 7/2005 | Chidlovskii et al. | |
| 2005/0289168 A1 | 12/2005 | Green et al. | |
| 2006/0115145 A1 | 6/2006 | Bishop et al. | |
| 2006/0217981 A1 | 9/2006 | Mahmudovska et al. | |
| 2006/0224385 A1 | 10/2006 | Seppala | |
| 2006/0245641 A1 | 11/2006 | Viola et al. | |
| 2007/0011009 A1 | 1/2007 | Nurimen et al. | |
| 2007/0239455 A1 | 10/2007 | Groble et al. | |
| 2008/0059152 A1 | 3/2008 | Fridman et al. | |
| 2008/0065383 A1 | 3/2008 | Schroeter | |
| 2008/0120093 A1 | 5/2008 | Izumida et al. | |
| 2008/0140398 A1 | 6/2008 | Shpigel | |
| 2008/0221893 A1 | 9/2008 | Kaiser | |
| 2009/0055183 A1 | 2/2009 | Yakhnenko et al. | |
| 2009/0089058 A1 | 4/2009 | Bellegarda | |
| 2009/0092323 A1 | 4/2009 | Qiu et al. | |
| 2009/0144056 A1 | 6/2009 | Aizenbud-Reshef et al. | |
| 2009/0204390 A1 | 8/2009 | Yamamoto et al. | |
| 2009/0326912 A1 | 12/2009 | Ueffing | |
| 2010/0138211 A1 | 6/2010 | Shi et al. | |
| 2010/0138402 A1 | 6/2010 | Burroughs et al. | |
| 2010/0145705 A1 | 6/2010 | Kirkeby | |
| 2010/0195909 A1 * | 8/2010 | Wasson et al. | 382/176 |
| 2010/0205198 A1 | 8/2010 | Mishne et al. | |
| 2010/0256969 A1 | 10/2010 | Li et al. | |
| 2010/0281009 A1 | 11/2010 | Wen et al. | |
| 2010/0312778 A1 | 12/2010 | Lu et al. | |
| 2011/0035210 A1 | 2/2011 | Rosenfeld et al. | |
| 2011/0040552 A1 * | 2/2011 | Van Guilder et al. | 704/4 |

OTHER PUBLICATIONS

John Lafferty et al.; "Conditional Random Fields: Probabilistic Models for Segmenting and Labeling Sequence Data"; Machine Learning—International Workshop, 2001 (8 pages).

Fei Sha et al.; "Shallow Parsing with Conditional Random Fields"; Proceedings of HLT-NAACL, 2003 (8 pages).

Charles Sutton et al.; "An Introduction to Conditional Random Fields for Relational Learning"; Introduction to statistical relational learning, 2007 (35 pages).

Huihsin Tseng et al.; "A Conditional Random Field Word Segmenter"; Sighan Bakeoff, 2005 (4 pages).

Hanna M. Wallach; "Conditional Random Fields: An Introduction"; CIS Technical Report MS-CIS-04-21, Feb. 24, 2004 (9 pages).

Dong Wang; "CRF-based Stochastic Pronunciation Modeling for Out-of-Vocabulary Spoken Term Detection"; Interspeech 2010, Sep. 26-30, 2010 (4 pages).

Geoffrey Zweig et al.; "SCARF: A Segmental CRF Speech Recognition System"; MSR-TR-2009-54, Apr. 2009 (14 pages).

International Search Report and Written Opinion in corresponding PCT application (i.e., PCT/US2012/038870), completed Oct. 23, 2012 (13 pages).

Liu et al., "Insertion, Deletion, or Substitution? Normalizing Text Messages without Pre-Categorization nor Supervision", Proceedings of the 49th Annual Meeting of the Association for Computational Linguistics:shortpapers; Jun. 19-24, 2011; pp. 71-76; USA (6 pages).

McCallum et al., "A Conditional Random Field for Discriminately-trained Finite-state String Edit Distance", Retrieved from the Internet: URL:http://people.cs.umass.edu/~mccallum/papers/crfstredit-uai05.pdf; USA (8 pages).

Pennell et al., "Normalization of Text Messages for Text-To-Speech", 2010 IEEE Conference on Acoustics Speech and Signal Processing; Mar. 14, 2010; pp. 4842-4845; USA (4 pages).

Yang et al., "Automatic Chinese Abbreviation Generation Using Conditional Random Field," Proceedings of NAACL HLT 2009: Short Papers; Jan. 1, 2009; pp. 273-275; Retrieved from the Internet: URL:http://aclweb.org/anthologynew/N/N09/N09-2069.pdf; USA (3 pages).

Report from International Searching Authority in corresponding PCT application (i.e., PCT/US2013/028040), mailed Jun. 4, 2013 (7 pages).

Gouws et al., "Unsupervised Mining of Lexical Variants from Noisy Text", Proceedings of EMNLP, Conference on Empirical Methods in Natural Language; Jul. 31, 2011; pp. 82-90; Edinburgh, Scotland, UK ( 9 pages).

Klinger et al., "Classical Probabilistic Models and Conditional Random Fields", Algorithm Engineering Report, TR07-2-013, Faculty of Computer Science; Dec. 2007; pp. 1-31; Dortmund, Germany (32 pages).

Liu et al., "A Broad-Coverage Normalization System for Social Media Language", Research and Technology Center, Robert Bosch LLC; Jul. 11, 2012; pp. 1-10; USA (8 pages).

Salton et al., A Vector Space Model for Automatic Indexing, Communications of the ACM, Association for Computing Machinery, Inc.; Nov. 1, 1975; pp. 613-620; vol. 11, No. 18; Cornell University, USA.

Petrovic et al., "The Edinburgh Twitter Corpus", Edinburgh, Scotland, UK (2 pages).

* cited by examiner

BROAD-COVERAGE NORMALIZATION SYSTEM FOR SOCIAL MEDIA LANGUAGE

CLAIM OF PRIORITY

This application is a continuation in part of copending U.S. application Ser. No. 13/117,330, which is entitled "Method and System for Text Message Normalization Based on Character Transformation and Web Data," and was filed on May 27, 2011. This application further claims priority to U.S. Provisional Application No. 61/603,483, which is entitled "Broad-Coverage Normalization System For Social Media Language," and was filed on Feb. 27, 2012.

TECHNICAL FIELD

This disclosure relates generally to the fields of natural language processing and text normalization, and, more specifically, to systems and methods for normalizing text prior to speech synthesis or other analysis.

BACKGROUND

The field of mobile communication has seen rapid growth in recent years. Due to growth in the geographic coverage and bandwidth of various wireless networks, a wide variety of portable electronic devices, which include cellular telephones, smart phones, tablets, portable media players, and notebook computing devices, have enabled users to communicate and access data networks from a variety of locations. These portable electronic devices support a wide variety of communication types including audio, video, and text-based communication. Portable electronic devices that are used for text-based communication typically include a display screen, such as an LCD or OLED screen, which can display text for reading.

The popularity of text-based communications has surged in recent years. Various text communication systems include, but are not limited to, the Short Message Service (SMS), various social networking services, which include Facebook and Twitter, instant messaging services, and conventional electronic mail services. Many text messages sent using text communication services are of relatively short length. Some text messaging systems, such as SMS, have technical limitations that require messages to be shorter than a certain length, such as 160 characters. Even for messaging services that do not impose message length restrictions, the input facilities provided by many portable electronic devices, such as physical and virtual keyboards, tend to be cumbersome for inputting large amounts of text. Additionally, users of mobile messenger devices, such as adolescents, often compress messages using abbreviations or slang terms that are not recognized as canonical words in any language. For example, terms such a "BRB" stand for longer phrases such as "be right back." Users may also employ non-standard spellings for standard words, such as substituting the word "cause" with the non-standard "kuz." The alternative spellings and word forms differ from simple misspellings, and existing spell checking systems are not equipped to normalize the alternative word forms into standard words found in a dictionary. The slang terms and alternative spellings rely on the knowledge of other people receiving the text message to interpret an appropriate meaning from the text.

While the popularity of sending and receiving text messages has grown, many situations preclude the recipient from reading text messages in a timely manner. In one example, a driver of a motor vehicle may be distracted when attempting to read a text message while operating the vehicle. In other situations, a user of a portable electronic device may not have immediate access to hold the device and read messages from a screen on the device. Some users are also visually impaired and may have trouble reading text from a screen on a mobile device. To mitigate these problems, some portable electronic devices and other systems include a speech synthesis system. The speech synthesis system is configured to generate spoken versions of text messages so that the person receiving a text message does not have to read the message. The synthesized audio messages enable a person to hear the content of one or more text messages while preventing distraction when the person is performing another activity, such as operating a vehicle.

While speech synthesis systems are useful in reading back text for a known language, speech synthesis becomes more problematic when dealing with text messages that include slang terms, abbreviations, and other non-standard words used in text messages. The speech synthesis systems rely on a model that maps known words to an audio model for speech synthesis. When synthesizing unknown words, many speech synthesis systems fall back to imperfect phonetic approximations of words, or spell out words letter-by-letter. In these conditions, the output of the speech synthesis system does not follow the expected flow of normal speech, and the speech synthesis system can become a distraction. Other text processing systems, including language translation systems and natural language processing systems, may have similar problems when text messages include non-standard spellings and word forms.

While existing dictionaries may provide translations for common slang terms and abbreviations, the variety of alternative spellings and constructions of standard words that are used in text messages is too broad to be accommodated by a dictionary compiled from standard sources. Additionally, portable electronic device users are continually forming new variations on existing words that could not be available in a standard dictionary. Moreover, the mapping from standard words to their nonstandard variations is many-to-many, that is, a nonstandard variation may correspond to different standard word forms and vice versa. Consequently, systems and methods for predicting variations of standard words to enable normalization of alternative word forms to standard dictionary words would be beneficial.

SUMMARY

In one embodiment, a method for generating non-standard tokens from a standard token stored in a memory has been developed. The method includes selecting a standard token from a plurality of standard tokens stored in the memory, the selected token having a plurality of input characters, selecting an operation from a plurality of predetermined operations in accordance with a random field model for each input character in the plurality of input characters, performing the selected operation on each input character to generate an output token that is different from each token in the plurality of standard tokens, and storing the output token in the memory in association with the selected token.

In another embodiment, a method for generating operational parameters for use in a random field model has been developed. The method includes comparing each token in a first plurality of tokens stored in a memory to a plurality of standard tokens stored in the memory, identifying a first token in the first plurality of tokens as a non-standard token in response to the first token being different from each standard token in the plurality of standard tokens, identifying a second token in the first plurality of tokens as a context token in response to the second token providing contextual information for the first token, generating a database query including the first token and the second token, querying a database with the generated query, identifying a result token corresponding to the first token from a result obtained from the database, and storing the result token in association with the first token in a memory.

In another embodiment a system for generating non-standard tokens from standard tokens has been developed. The system includes a memory, the memory storing a plurality of standard tokens and a plurality of operational parameters for a random field model and a processing module operatively connected to the memory. The processing module is configured to obtain the operational parameters for the random field model from the memory, generate the random field model from the operational parameters, select a standard token from the plurality of standard tokens in the memory, the selected standard token having a plurality of input characters, select an operation from a plurality of predetermined operations in accordance with the random field model for each input character in the plurality of input characters for the selected standard token, perform the selected operation on each input character in the selected standard token to generate an output token that is different from each standard token in the plurality of standard tokens, and store the output token in the memory in association with the selected standard token.

In another embodiment, a method for selection of training data for generation of a statistical model has been developed. The method includes identifying a plurality of occurrences of a non-standard token in a text corpus stored in a memory, identifying a first plurality of tokens in the text corpus that are located proximate to at least one of the occurrences of the non-standard token, identifying a plurality of occurrences of a candidate standard token in the text corpus, identifying a second plurality of tokens in the text corpus that are located proximate to at least one of the occurrences of the candidate standard token, identifying a contextual similarity between the first plurality of tokens and the second plurality of tokens, generating a statistical model for correction of non-standard tokens with the non-standard token in association with the standard token for generation of a statistical model only in response to the identified contextual similarity being greater than a predetermined threshold, and storing the generated statistical model in the memory for use in identification of another standard token that corresponds to another non-standard token identified in text data that are not included in the text corpus.

In another embodiment, a method for identification of a standard token in a dictionary that corresponds to a non-standard token has been developed. The method includes identifying a candidate token in a plurality of standard tokens stored in a memory, identifying a longest common sequence (LCS) of features in the candidate token corresponding to at least one feature in the candidate token that is present in the non-standard token, identifying a number of features in the LCS, identifying a frequency of the candidate token in a text corpus stored in a memory, identifying a similarity score between the non-standard token and the standard token with reference to a ratio of the identified number of features in the LCS to a total number of features in the non-standard token multiplied by a logarithm of the identified frequency of the candidate token, and presenting with a user interface device the standard candidate token to a user in replacement of the non-standard token or in association with the non-standard token in response to the identified similarity score exceeding a predetermined threshold.

In another embodiment, a method for identification of a standard token in a dictionary that corresponds to a non-standard token has been developed. The method includes identifying a first standard token corresponding to the non-standard token, the standard token being included in a dictionary having a plurality of standard tokens stored in a memory, the identification of the first standard token being made through transformation of a first plurality of features in the first standard token into a corresponding second plurality of features in the non-standard token using a conditional random field (CRF) model, identifying a second standard token in the dictionary of standard tokens corresponding to the non-standard token, the identification of the second standard token being made with reference to a comparison of the non-standard token with the standard tokens stored in the dictionary, identifying a first noisy channel score for the first standard token with reference to a first conditional probability value and a probability of the first standard token occurring in a text corpus stored in the memory, the first conditional probability value corresponding to the first standard token given the non-standard token from the CRF model, identifying a second noisy channel score for the second standard token with reference to a second conditional probability value and a probability of the second standard token occurring in the text corpus, the second conditional probability value corresponding to the second standard token given the non-standard token from the comparison, presenting with a user interface device the first standard token to a user in replacement of the non-standard token or in association with the non-standard token in response to the first noisy channel score being greater than the second noisy channel score, and presenting with the user interface device the second standard token to the user in replacement of the non-standard token or in association with the non-standard token in response to the second noisy channel score being greater than the first noisy channel score.

DETAILED DESCRIPTION

Figure 1:
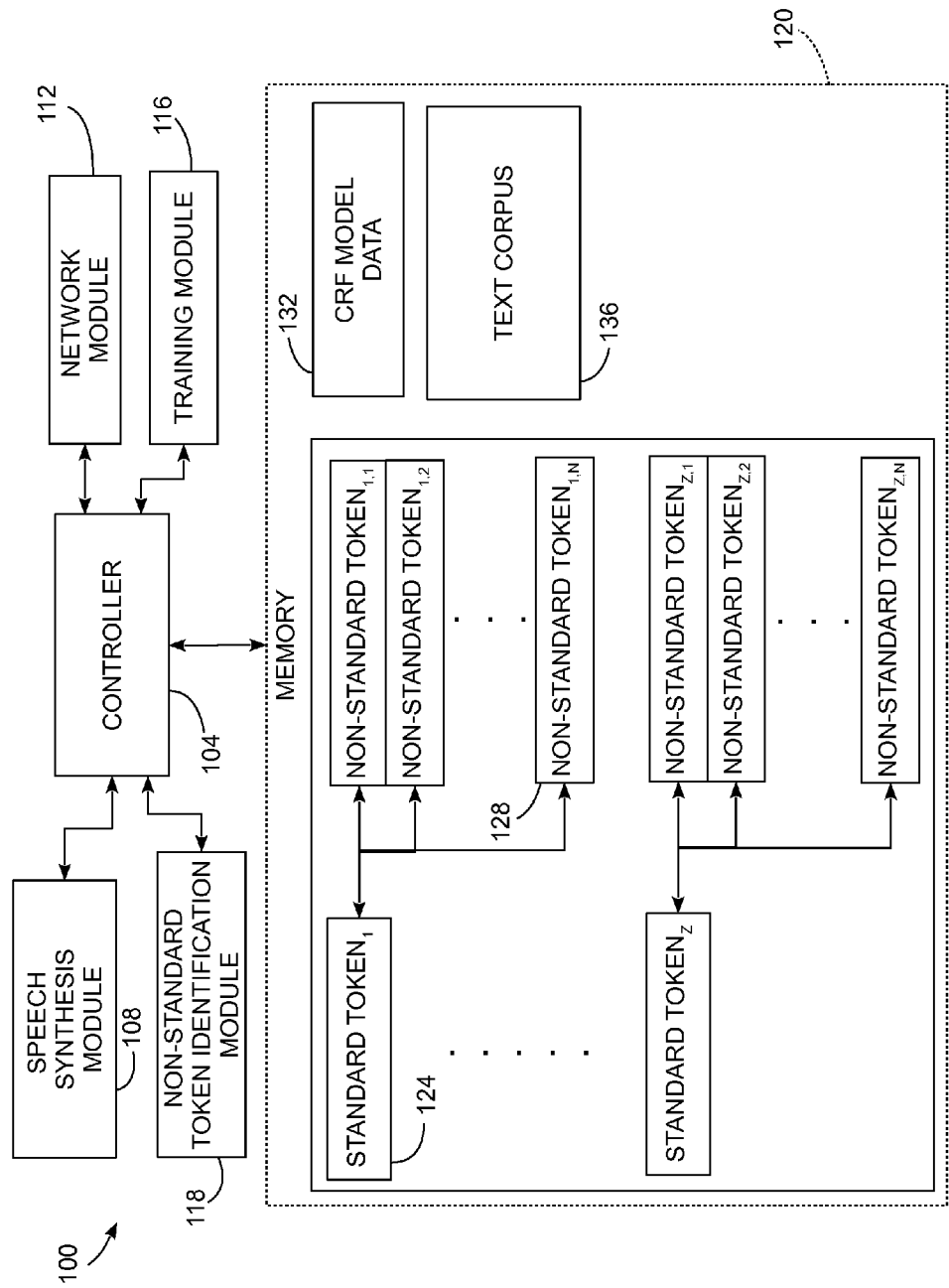
FIG. 1 is a schematic diagram of a system for generating non-standard tokens corresponding to standard tokens using a conditional random field model and for synthesizing speech from text including the standard tokens and the non-standard tokens.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "token" refers to an individual element in a text that may be extracted from the text via a tokenization process. Examples of tokens include words separated by spaces or punctuation, such as periods, commas, hyphens, semicolons, exclamation marks, question marks and the like. A token may also include a number, symbol, combination of words and numbers, or multiple words that are associated with one another. A "standard token" is a token that is part of a known language, including English and other languages. A dictionary stored in the memory of a device typically includes a plurality of standard tokens that may correspond to one or more languages, including slang tokens, dialect tokens, and technical tokens that may not have universal acceptance as part of an official language. In the embodiments described herein, the standard tokens include any token that a speech synthesis unit is configured to pronounce aurally when provided with the standard token as an input. A non-standard token, sometimes called an out-of vocabulary (OOV) token, refers to any token that does not match one of the standard tokens. As used herein, a "match" between two tokens refers to one token having a value that is equivalent to the value of another token. One type of match occurs between two tokens that each have an identical spelling. A match can also occur between two tokens that do not have identical spellings, but share common elements following predetermined rules. For example, the tokens "patents" and "patent" can match each other where "patents" is the pluralized form of the token "patent."

The embodiments described herein employ a conditional random field model to generate non-standard tokens that correspond to standard tokens to enable speech synthesis and other operations on text messages that include non-standard tokens. The term "conditional random field" (CRF) refers to a probabilistic mathematical model that includes an undirected graph with vertices connected by edges. More generally, the term "random field model" as used herein refers to various graphical models that include a set of vertices connected by edges in a graph. Each vertex in the graph represents a random variable, and edges represent dependencies between random variables. Those having ordinary skill in the art will recognize that other random fields, including but not limited to Markov random field models and hidden Markov random field models, are suitable for use in alternative embodiments. As used herein, the term "feature" as applied to a token refers to any linguistically identifiable component of the token and any measurable heuristic properties of the identified components. For example, in English words, features include characters, morphemes, phonemes, syllables, and combinations thereof.

In an exemplary CRF model, a first set of vertices Y in the graph represent a series of random variables representing possible values for features, such as characters, phonemes, or syllables, in a token. The vertices Y are referred to as a label sequence, with each vertex being one label in the label sequence. A second set of vertices X in the graph represent observed feature values from an observed token. For example, observed features in a token could be known characters, phonemes, and syllables that are identified in a standard token. A probability distribution of the label sequence Y is conditioned upon the observed values using conditional probability P(Y|X). In a common form of a CRF, a series of edges connect the vertices Y together in a linear arrangement that may be referred to as a chain. The edges between the vertices Y each represent one or more operations that are referred to as transition feature functions. In addition to the edges connecting the vertices Y, each vertex in the sequence of observed features X indexes a single vertex in the set of random variables Y. A second set of edges between corresponding observed feature vertices in X and the random variables in Y represent one or more operations that are referred to as observation feature functions.

Figure 9:
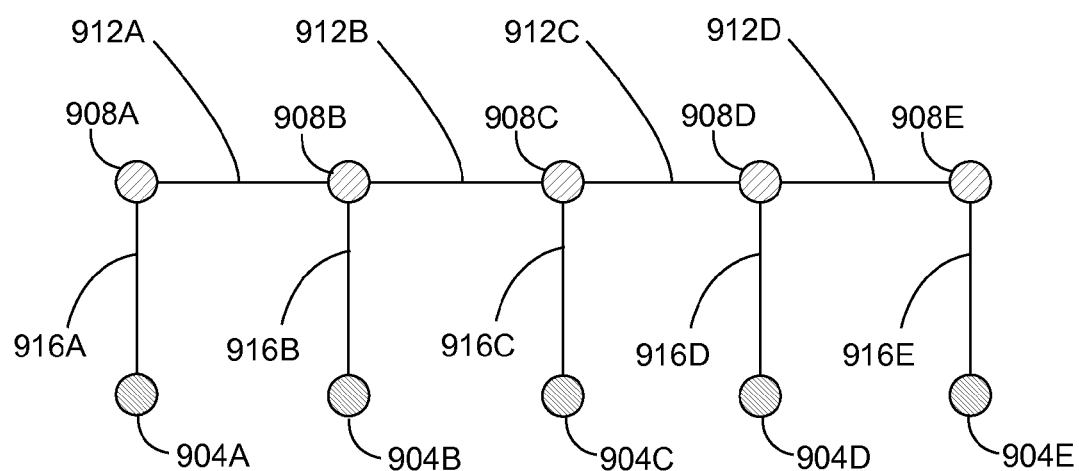
FIG. 9 is a graph of a prior-art conditional random field model.

FIG. 9 depicts an exemplary structure of a prior art CRF. In FIG. 9, nodes 904A-904E represent a series of observed features X from a given token. Nodes 908A-908E represent a series of random variables representing a label sequence Y. Edges 912A-912D join the nodes 908A-908E in a linear chain. Each of the edges 912A-912D correspond to a plurality of transition feature functions that describe transitions between adjacent labels. The transition feature functions describe distributions of the random variables in the label sequence Y based on other labels in the label sequence and the observed sequence X. For example, a transition feature function $f_e$ may describe the probability of one character following another character in a token, such as the probability that the character "I" precedes the character "E" in a word. Due to the undirected nature of the CRF graph, the probability distributions for each of the random variables in the labels 908A-908D depend upon all of the other labels in the graph. For example, the probability distribution for labels 908B and 908C are mutually dependent upon one another, upon the labels 908A and 908D-908E, and upon the observed feature nodes 904A-904E.

The probability distribution of the label sequence Y is based on both the transitions between features within the labels in the sequence Y itself, as well as the conditional probability based on the observed sequence X. For example, if label 908B represents a probability distribution for an individual character in a token, the transition feature functions describe the probability distribution for the label 908B based on other characters in the label sequence, and the observation feature functions describe the probability distribution for the label 908B based on the dependence based on observed characters in the sequence X. The total probability distribution p(Y|X) of a label sequence Y that includes k labels conditioned upon an observed set X is provided by the following proportionality:

$$p(Y|X) \propto e^{\Sigma_{k=1}^{n}(\Sigma_j \lambda_j f_j(y_k, y_{k-1}, X) + \Sigma_i \mu_i g_i(x_k, y_k, X))}$$

The functions $f_j$ represent a series of transition feature functions between adjacent labels in the label sequence Y, such as the edges 912A-912D conditioned on the observed sequence X. The functions $g_i$ represent a series of observation feature functions between the observed vertices 904A-904E and the labels 908A-908E, such as the edges 916A-916E. Thus, the conditional probability distribution for the label sequence Y is dependent upon both the transition feature functions and the observation feature functions. The terms $\lambda_j$ and $\mu_i$ are a series of operational parameters that correspond to each of the transition feature functions $f_j$ and observation feature functions $g_i$, respectively. Each of the operational parameters $\lambda_j$ and $\mu_i$ is a weighted numeric value that is assigned to each of the corresponding transition feature functions and observation feature functions, respectively. As seen from the proportionality p(Y|X), as the value of an operational parameter increases, the total conditional probability associated with a corresponding transition feature function or observation feature function also increases. As described below, the operational parameters $\lambda_j$ and $\mu_i$ are generated using a training set of predetermined standard tokens and corresponding non-standard tokens. The generation of the operational parameters $\lambda_j$ and $\mu_i$ is also referred to as "training" of the CRF model.

FIG. 1 depicts a token processing system 100 that is configured to generate parameters for a CRF model, and to apply the CRF model to a plurality of standard tokens to generate non-standard tokens that the CRF model indicates are likely to occur in text strings processed by the system 100. The system 100 includes a controller 104, speech synthesis module 108, network module 112, training module 116, non-standard token identification module 118, and a memory 120. The controller 104 is an electronic processing device such as a microcontroller, application specific integrated circuit (ASIC), field programmable gate array (FPGA), microprocessor including microprocessors from the x86 and ARM families, or any electronic device configured to perform the functions disclosed herein. Controller 104 implements software and hardware functional units, including speech synthesis module 108, network module 112, training module 116, and non-standard token identification module 118. One embodiment of the speech synthesis module includes audio digital signal processor (DSP) for generation of synthesized speech. Various embodiments of the network module 112 include a wired Ethernet adapter, a wireless network adaptor configured to access a wireless Local Area Network (LAN), such as an IEEE 802.11 network, and a wireless network adaptor configured to access a wireless wide area network (WAN), including 3G, 4G and any other wireless WAN network. In one configuration, the controller 104 performs the functions of training module 116 and non-standard token identification module 118 as a software program. As described below, the training module 116 generates parameters for the conditional random field model.

The controller 104 is operatively connected to the memory 120. Embodiments of the memory 120 include both volatile and non-volatile data storage devices including, but not limited to, static and dynamic random access memory (RAM), magnetic hard drives, solid state drives, and any other data storage device that enables the controller 104 to store data in the memory 120 and load data from the memory 120. The memory 120 includes a plurality of standard tokens 124. The speech synthesis module 108 is configured to generate an aural rendition of each of the standard tokens 124. In some embodiments, the standard tokens are generated using dictionaries corresponding to one or more languages for which the system 100 is configured to synthesize speech. The memory 120 stores a plurality of non-standard tokens in association with each standard token. In FIG. 1, a first group of non-standard tokens 128 is associated with one of the standard tokens 124. The non-standard tokens 128 are each a different variation of the corresponding standard token 124. For example, if the word "cause" is a standard token stored in the memory 120, various non-standard tokens stored in the memory 120 can include "kuz," "cauz," and "cus."

In the example of FIG. 1, controller 104 is configured to generate a model of a conditional random field (CRF) from CRF model data 132 stored in the memory 120. The CRF model data 132 include a plurality of transition feature functions $f_j$ and associated parameters $\lambda_j$, and observation feature functions $g_i$ with associated parameters $\mu_i$. The controller 104 is configured to select a standard token from the plurality of standard tokens 124 in the memory 120, generate one or more non-standard tokens using the CRF model, and store the non-standard tokens in association with the selected standard token in the memory 120. The memory 120 further includes a text corpus 136. As used herein, the term "text corpus" refers to text data including a large number of both standard and non-standard tokens that are observed in the text of communication messages that are sent between a large population of communication service users. Examples of communication services that generate messages with text data for observation and storage in the text corpus 136 include, but are not limited to, SMS messaging, instant messaging, email, and social network services. The text corpus 136 stored in the memory 120 includes the text data stored in a format that enables the controller 104 to identify standard and non-standard tokens, and to identify the multiple communication messages that form the text corpus data 136. For example, in an embodiment where the text corpus 136 stores email messages, the text corpus data also include email header and other associated metadata that enable the controller 104 to identify the total number of email messages in the text corpus 136, and to identify particular email messages that include identified tokens. In some embodiments, a text corpus 136 includes only text data corresponding to messages from predetermined communication services that are available to the system 100. For example, if the system 100 is configured to send and receive SMS text messages, but not email messages, then the text corpus data 136 are optionally limited to including only SMS text messages from a large user population and do not include email messages. During operation, the system 100 receives additional communication messages that are not included in the text corpus data 136, and the controller 104 is configured to generate a user interface output, including speech synthesis output, of a standard token that replaces the non-standard token. As described in more detail below, the controller 104 and training module 116 are configured to train the CRF model using standard tokens and non-standard tokens obtained from the text corpus 136.

Figure 2:
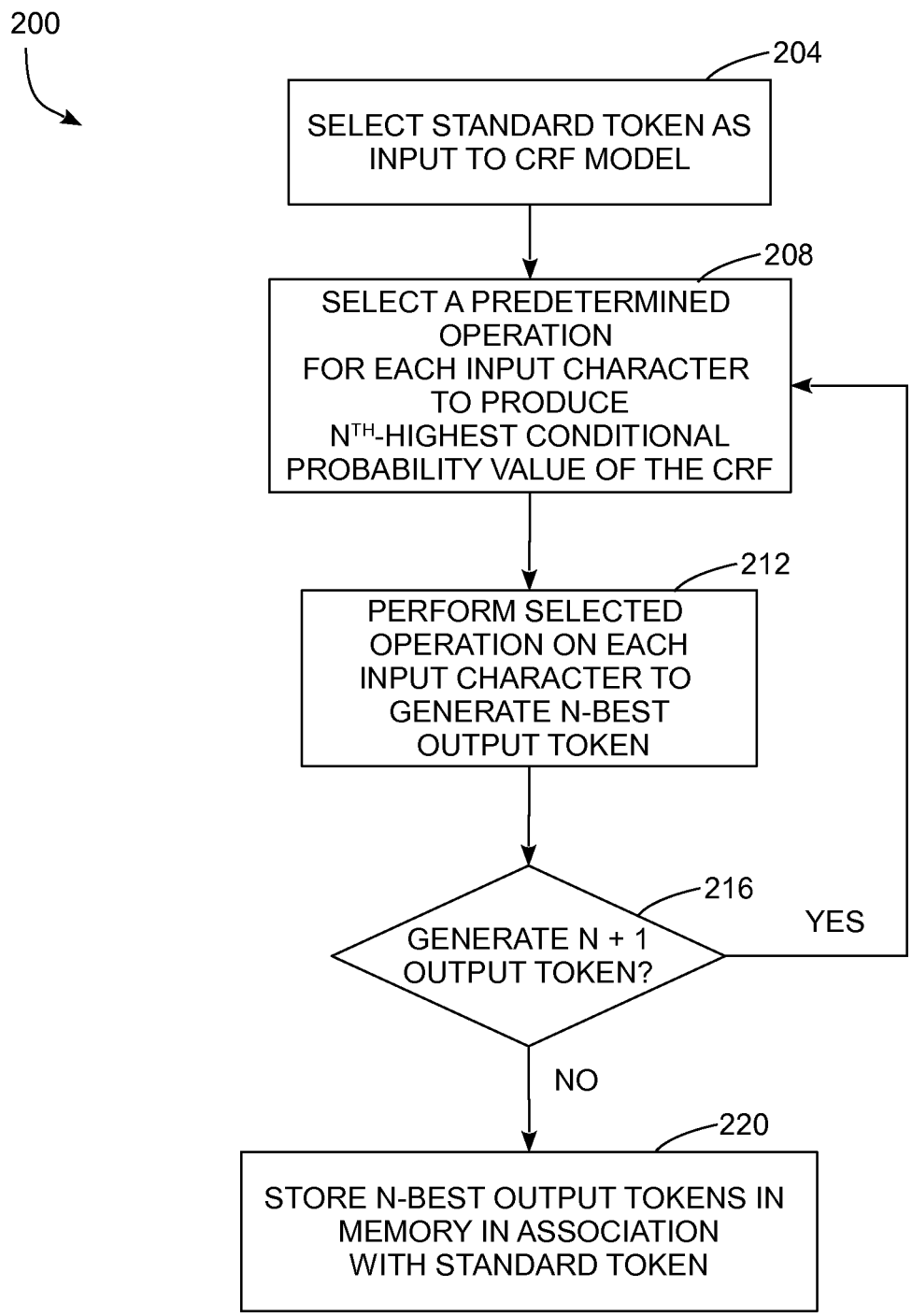
FIG. 2 is a block diagram of a process for generating non-standard tokens from a standard token using a conditional random field model.
Figure 3:
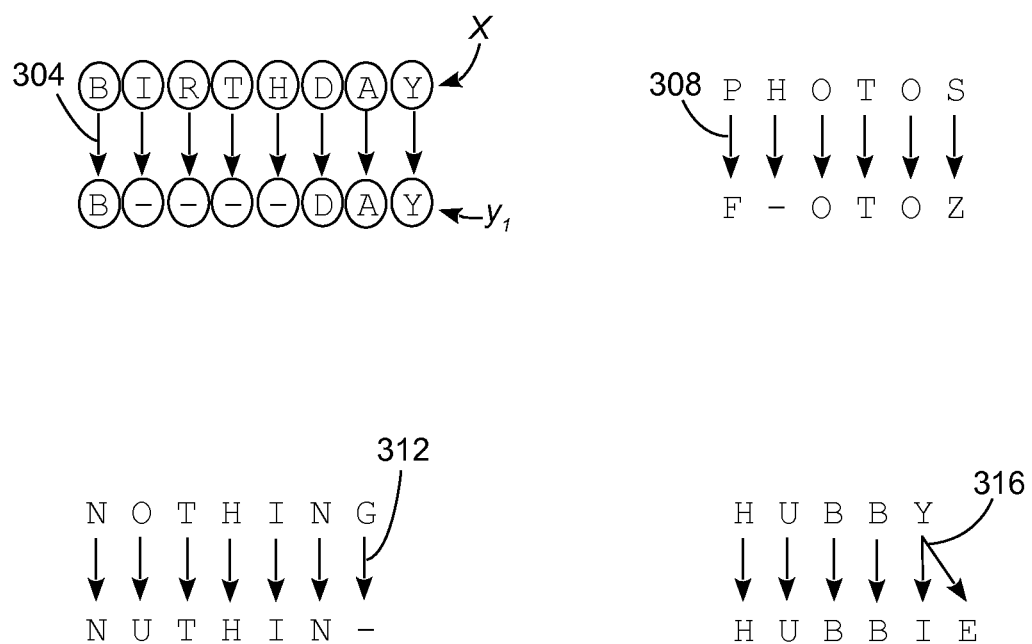
FIG. 3 depicts examples of operations between characters in various standard tokens and corresponding non-standard tokens.

FIG. 2 depicts a process 200 for using a CRF model to generate a non-standard token using a plurality of input characters from a standard token, and FIG. 3 depicts examples of operations that may be performed on input characters from a standard token to generate non-standard tokens. Process 200 begins by selecting a standard token as an input to the CRF model (block 204). Using system 100 from FIG. 1 as an example, the controller 104 obtains one of the standard tokens 124 from the memory 120. Each of the characters in the standard token are observed features X in the CRF graph. In FIG. 3, the standard token "BIRTHDAY" is depicted with each character in the token being shown as one of the nodes in the observed feature set X.

Once the standard token is selected, process 200 selects an operation to perform on each character in the standard token from a predetermined set of operations (block 208). The operations are chosen to produce an output token having the $N^{th}$ highest conditional probability p(Y|X) using the proportionality described above with the input features X and the CRF model using transition feature functions $f_j(y_k, y_{k-1}, X)$, observation feature functions $g_i(x_k, y_k, X)$, and operational parameters $\lambda_j$ and $\mu_i$. The N-best non-standard tokens are generated using a decoding or search process. In one embodiment, process 200 uses a combination of forward Viterbi and backward A* search to select a series of operations. These operations are then applied to the corresponding input characters in the standard token to generate an output token.

Once the operation for each of the input characters in the standard token is selected, process 200 performs the selected operations on the characters in the standard token to produce an output token. In process 200, the types of predetermined operations include replacing the input character with one other character in the non-standard token, providing the input character to the non-standard token without changing the input character, generating the output token without any characters corresponding to the input character, and replacing the input character with two predetermined characters.

Using English as an example language, the single character replacement operations include 676 ($26^2$) operations corresponding to replacement of one input character that is a letter in the English alphabet with another letter from the English alphabet. As shown in FIG. 3, the single-letter replacement operation changes the letter "P" 308 in the standard token "PHOTOS" to the letter "F" in the non-standard output token "F-OTOZ." Some non-standard tokens replace an alphabetic letter with a numeric character or other symbol, such as a punctuation mark. The operation to provide a character in the input token to the output token unchanged is a special-case of the single character replacement operation. In the special case, the input character corresponds to an output character having the same value as the input character. In FIG. 3, the character "B" 304 in the standard token "BIRTHDAY" corresponds to the equivalent character "B" in the output token "B-DAY."

Another special-case for the single character replacement operation occurs when an input character in the standard token is omitted from the output token. An operation to omit an input character from the output token can be characterized as converting the input character to a special "null" character that is subsequently removed from the generated output token. As shown in FIG. 3, the character "G" 312 in the standard token "NOTHING" is converted to a null character, signified by a "-" symbol, in the output token "NUTHIN-."

Process 200 includes a predetermined selection of operations for generating a combination of two characters, referred to as a digraph, in the output token from a single character in the standard token. Using English standard tokens as an example, a single input character can be replaced by the combinations of "CK," "EY," "IE," "OU," and "WH," which are selected due to their frequency of use in English words and in non-standard forms of standard English tokens. Alternative embodiments of process 200 include operations to generate different digraphs from a single input character, and generate combinations of three or more characters that correspond to a single input character. As shown in FIG. 3, the input character "Y" 316 in the standard token "HUBBY" is replaced by a selected digraph "IE" in the output token "HUBBIE."

Process 200 generates a plurality of non-standard tokens corresponding to a single standard token. Since multiple non-standard variations for a single standard token can occur in different text messages, process 200 can continue to generate N predetermined non-standard tokens that correspond to the standard token (block 216). The operations to generate each successive non-standard token are selected to have the $N^{th}$ highest conditional probability $p(t_i|s_i)$, for the non-standard token $t_i$ that is generated given the standard dictionary token $s_i$ and the CRF model. As described below, the conditional probability $p(t_i|s_i)$ for the generated non-standard token is used as a score for the generated non-standard token to standard token association. The scores of different results from the CRF model and other standard token suggestion models are used to rank suggested standard token candidates for replacement of non-standard tokens in order from highest to lowest score. In one embodiment, process 200 generates twenty non-standard output tokens that correspond to the standard token, corresponding to the twenty highest conditional probability values identified for the CRF model and the characters in the standard token. Process 200 stores each of the output tokens in memory in association with the standard token (block 220). Each output token may be stored in memory at any time after the output token is generated. As seen in FIG. 1, the N non-standard tokens 128 are associated with one of the standard tokens 124. The non-standard tokens are stored in an array, database, lookup table, or in any arrangement that enables identification of each non-standard token and the associated standard token.

Figure 4:
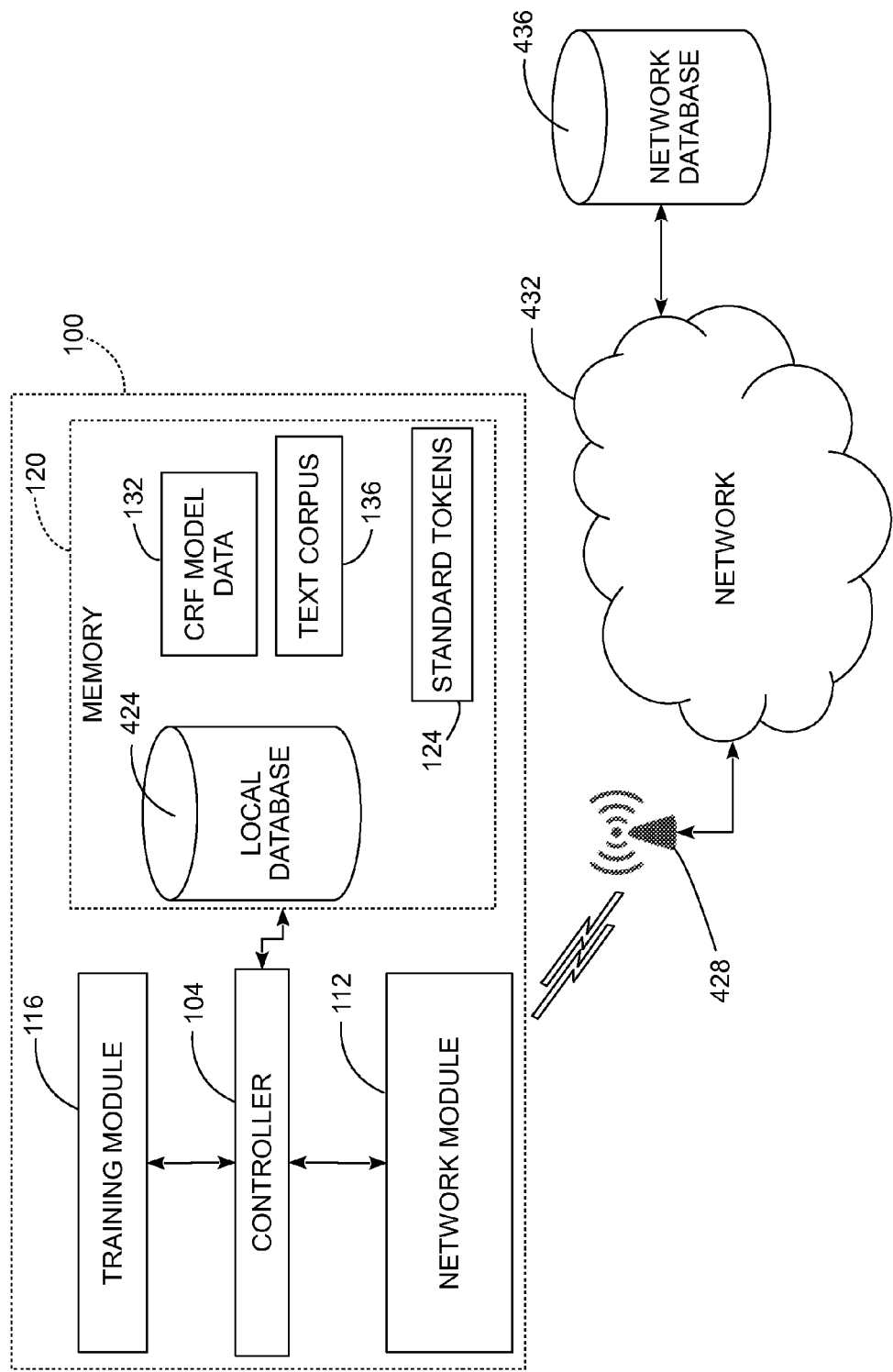
FIG. 4 is a schematic diagram of the system of FIG. 1 configured to generate queries for a database and receive results from the database to associate non-standard tokens with known standard tokens used for training of a conditional random field model.

FIG. 4 depicts a configuration of the system 100 for generation of the operational parameters $\lambda_j$ and $\mu_i$ for the CRF model used to generate non-standard tokens from the standard tokens. In the configuration of FIG. 4, controller 104 executes programmed instructions provided by the training module 116 to generate the operational parameters $\lambda_j$ and $\mu_i$. To generate the operational parameters $\lambda_j$ and $\mu_i$, the controller 104 identifies non-standard tokens in text corpus 136 and then identifies standard tokens corresponding to the non-standard tokens. Each of the non-standard tokens is paired with a corresponding standard token. The operational parameters of the CRF model data 132 are generated statistically using the pairs of corresponding non-standard and standard tokens. Once the operational parameters $\lambda_j$ and $\mu_i$ are generated, the CRF model is "trained" and can subsequently generate non-standard tokens when provided with standard tokens. Once trained, at least a portion of the non-standard tokens that are generated in accordance with the CRF model are different from any of the non-standard tokens presented in the text corpus 136.

Figure 5:
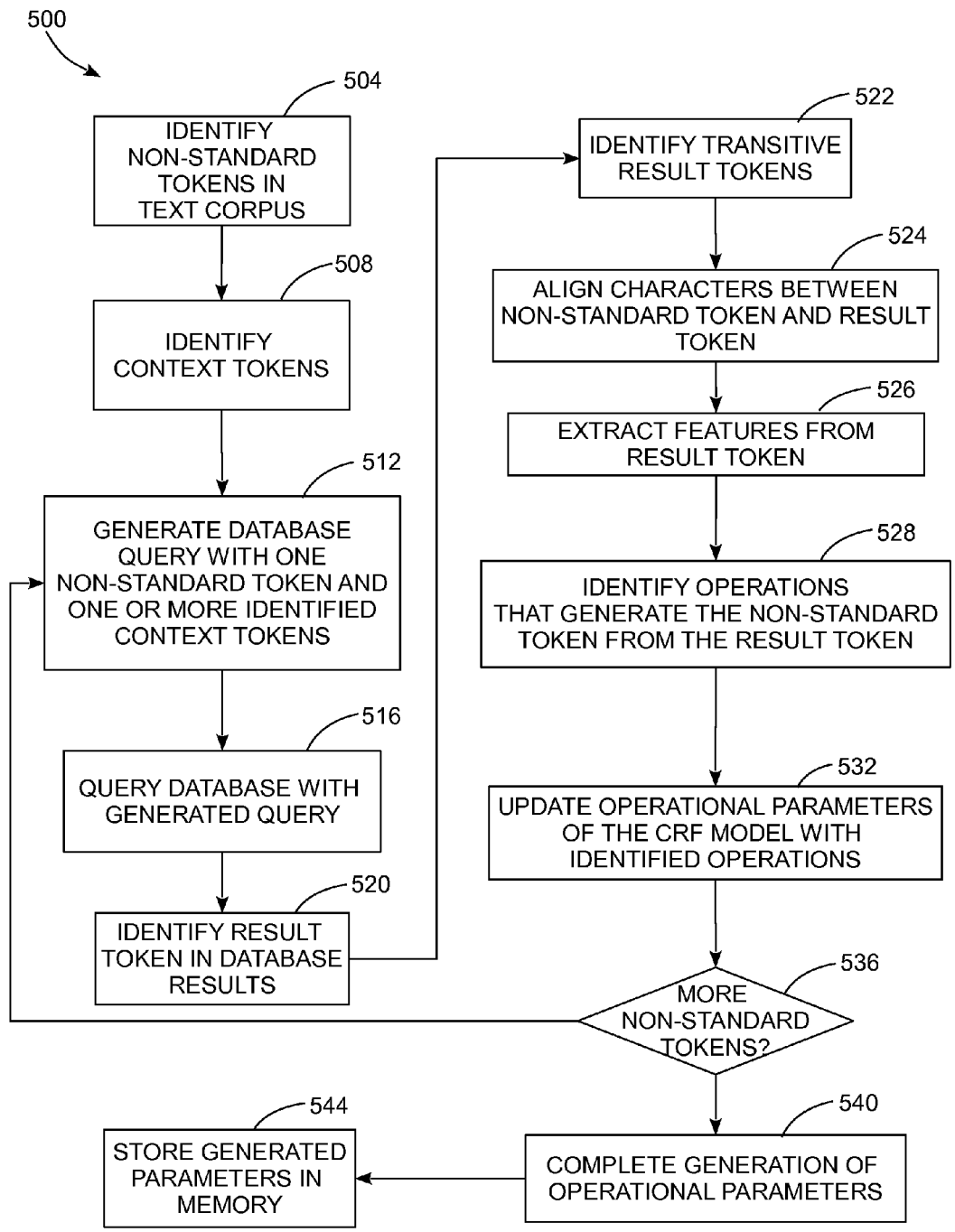
FIG. 5 is a block diagram of a process for generating training data and for training a conditional random field model.

FIG. 5 depicts a process 500 for generating pairs of non-standard and standard tokens and for generation of the operational parameters $\lambda_j$ and $\mu_i$ in the CRF model. The configuration of system 100 depicted in FIG. 4 performs the process 500. Process 500 begins by identifying a plurality of non-standard tokens in a text corpus (block 504). The source of the text corpus is selected to include a sufficient number of relevant standard tokens and non-standard tokens to enable generation of representative operational parameters for the CRF model. For example, a collection of text messages written by a large number of people who are representative of the typical users of the system 100 contains relevant non-standard tokens. In system 100, the controller 104 compares the tokens in text corpus 136 to the standard tokens 124. Non-standard tokens in the text corpus 136 do not match any of the standard tokens 124. In practical embodiments, the standard tokens 124 are arranged for efficient searching using hash tables, search trees, and various data structures that promote efficient searching and matching of standard tokens. In system 100, each of the standard tokens in the text corpus 136 matches a standard token 124 stored in the memory 120.

To eliminate typographical errors from consideration, process 500 identifies a single non-standard token only if the number of occurrences of the non-standard token in the text corpus exceeds a predetermined threshold. Process 500 also identifies context tokens in the text corpus (block 508). As used herein, the term "context token" refers to any token other than the identified non-standard token that provides information regarding the usage of the non-standard token in the text corpus to assist in identification of a standard token that corresponds to the non-standard token. The context tokens information about the non-standard token that is referred to as "contextual information" since the context tokens provide additional information about one or more text messages that include the non-standard token. The context tokens can be either standard or non-standard tokens.

Process 500 generates a database query for each of the non-standard tokens (block 512). In addition to the non-standard token, the database includes one or more of the context tokens identified in the text corpus to provide contextual information about the non-standard token. The database query is formatted for one or more types of database, including network search engines and databases configured to perform fuzzy matching based on terms in a database query. In FIG. 4, the system 100 includes a local database 424 stored in the memory 120 that is configured to receive the database query and generate a response to the query including one or more tokens. The system 100 is also configured to send the database query using the network module 112. In a typical embodiment, the network module 112 transmits the query wirelessly to a transceiver 428. A data network 432, such as the Internet, forwards the query to an online database 436. Common examples of the online database are search engines such as search engines that search the World Wide Web (WWW) and other network resources. The system 100 is configured to perform multiple database queries concurrently to reduce the amount of time required to generate database results. Multiple concurrent queries can be sent to a single database, such as the online database 436, and concurrent queries can be sent to multiple databases, such as databases 424 and 436, simultaneously.

Figure 6A:
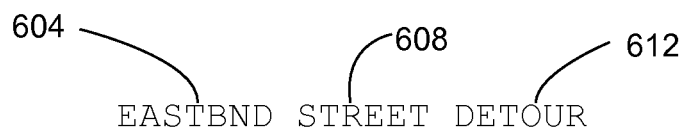
FIG. 6A is an example of a database query formatted as search terms for a search engine including a non-standard token.

FIG. 6A depicts a database query where a non-standard token 604 and context tokens 608 and 612 are search terms for a search engine. The query includes the non-standard token "EASTBND" 604. The context tokens "STREET" 608 and "DETOUR" 612 are selected from the text corpus and are included in the database query. In one embodiment, the selected context tokens are located near the non-standard token in a text message that includes the non-standard token to provide contextual information for the non-standard token. For example, the standard tokens 608 and 612 may be in the same sentence or text message as the non-standard token 604.

Process 500 queries the selected database with the generated query (block 516). The database generates a query result including one or more tokens. When querying a network database 436, the result is sent via network 432 and wireless transceiver 428 to the system 100. In some embodiments, the system 100 generates multiple database queries for each non-standard token. Each of the database queries includes a different set of context tokens to enable the database to generate different sets of results for each query.

Process 500 identifies a token, referred to as a result token, from one or more candidate tokens that are present in the results generated by the database (block 520). The results of the database query typically include a plurality of tokens. One of the tokens may have a value that corresponds to the non-standard token used in the query. When the network database 436 is a search engine, the results of the search may include tokens that are highlighted or otherwise marked as being relevant to the search. Highlighted tokens that appear multiple times in the results of the search are considered as candidate tokens.

Process 500 filters the candidate tokens in the database result to identify a result token from the database results. First, candidate tokens that exactly match either the non-standard token or any of the context tokens included in the database query are removed from consideration as the result token. Each of the remaining candidate tokens is then aligned with the non-standard token and the context tokens in the database query along a longest common sequence of characters. As used herein, the term "longest common sequence of characters" refers to a sequence of one or more ordered characters that are present in the two tokens under comparison where no other sequence of characters common to both tokens is longer. Candidate tokens that have longest common sequences with a greater number of characters in common with any of the context tokens than with the non-standard token are removed from consideration as a result token. If the candidate token does not match any of the tokens provided in the database query and its longest common character sequence with the non-standard token is greater than a predefined threshold, the candidate token is identified as a result token corresponding to the non-standard token.

Figure 6B:
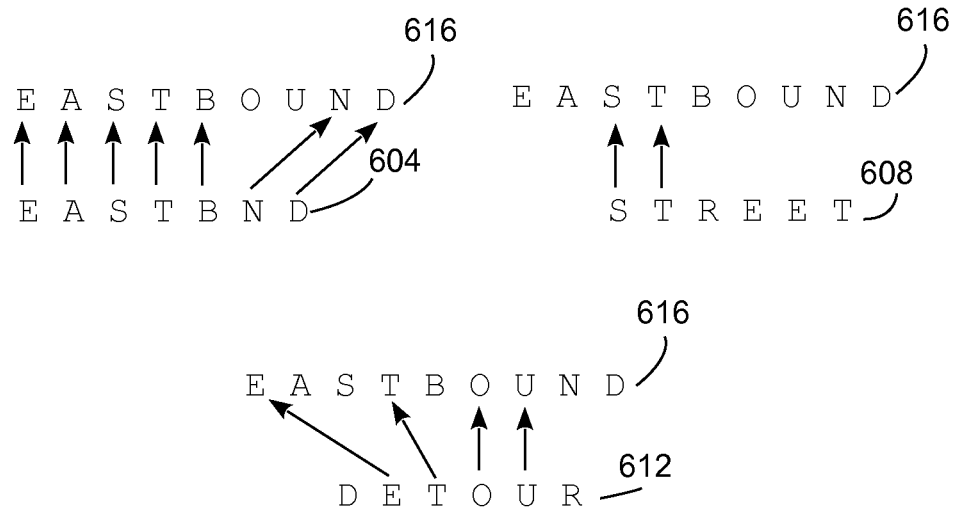
FIG. 6B depicts the terms from the database query of FIG. 6A aligned along a longest common sequence of characters with a candidate token.

FIG. 6B depicts a candidate token "EASTBOUND" aligned along the longest common sequence of characters with the tokens depicted in FIG. 6A. The token "EASTBOUND" is not a direct match for any of the database query terms 604, 608, and 612. As shown in FIG. 6B, the two context tokens 608 and 612 have longest common character sequence of two and four characters respectively with the candidate token 616, while the non-standard token 604 has a longest common sequence of seven characters. Once identified, the result token is stored in memory in association with the non-standard token. The training data used to train the CRF model includes multiple pairings of result tokens with non-standard tokens.

Referring again to FIG. 5, process 500 identifies transitive results that may correspond to the identified non-standard token and result token (block 522). Transitive results refer to a condition where a result token is also a non-standard token, and another non-standard token having an equivalent value corresponds to a standard token. For example, a first result-token non-standard token pair is (cauz, cuz), while a second result-token non-standard token pair is (cause, cauz). The result token "cauz" in the first pair is a non-standard token, and the second pair associates "cauz" with the standard token "cause." Process 500 associates the non-standard token "cuz" with the transitive standard result token "cause." The transitive association between non-standard result tokens enables process 500 to identify standard tokens for some non-standard tokens when the corresponding result tokens in the database query are also non-standard tokens.

Process 500 aligns linguistically identifiable components of the non-standard token with corresponding components in the result token (block 524). The components include individual characters, groups of characters, phonemes, and/or syllables that are part of the standard token. Alignment between the non-standard token and the result token along various components assists in the generation of the operational parameters $\mu_i$ for the observation feature functions $g_i$. In one embodiment, the standard token and non-standard token are aligned on the character, phonetic, and syllable levels as seen in Table 1. Table 1 depicts an exemplary alignment for the standard token EASTBOUND with non-standard token EASTBND. The features identified in Table 1 are only examples of commonly identified features in a token. Alternative embodiments use different features, and different features can be used when analyzing tokens of different languages as well. In Table 1, the "--" corresponds to a null character

TABLE 1

Alignment of Features Between Standard and Non-Standard Tokens

| Result Token | E | A | S | T | B | O | U | N | D |
|---|---|---|---|---|---|---|---|---|---|
| Current Character | E | A | S | T | B | O | U | N | D |
| Next Character | A | S | T | B | O | U | N | D | -- |
| Next Two Characters | AS | ST | TB | BO | OU | UN | ND | D-- | -- -- |
| Current Phoneme | I: | I: | S | T | B | Aʊ | Aʊ | N | D |
| Next Phoneme | S | S | T | B | Aʊ | Aʊ | N | D | -- |
| Morpheme boundary | B | I | I | L | B | I | I | I | L |
| Vowel? | Y | Y | N | N | N | Y | Y | N | N |
| Begins Syllable? | Y | N | N | N | Y | N | N | N | N |
| Non-Standard Token | E | A | S | T | B | -- | -- | N | D |

In Table 1, each of the columns includes a vector of features that correspond to a single character in the standard token and a corresponding single character in the non-standard token. For example, the character "O" in the standard token has a set of character features corresponding to the character "O" itself, the next character "U", and next two characters "OU." The letter O in EASTBOUND is part of the phoneme Aʊ, with the next phoneme in the token being the phoneme N as defined in the International Phoneme Alphabet (IPA) for English. Table 1 additionally includes encodings of morphemes, which are the smallest unit of a word that include semantic meaning. Each morpheme includes one or more of the characters in the word. In the table 1, the morphemes are encoded using the BILOU tagging scheme, where B stands for the beginning of a morpheme, I stands for a character that is inside the morpheme, L stands for the last character in a morpheme, O stands for a character that is outside the morpheme, and U stands for a morpheme that includes only one character, which are referred to as unit length morphemes. The token EASTBND does not include outside or unit morphemes, but examples of unit morphemes in English include the "s" character that is used to pluralize a word, and examples of outside morphemes include [* *]. Table 1 also identifies the character "O" as being a vowel, and identifies that O is not the first character in a syllable. Process 500 extracts the identified features for each of the characters in the standard token into a feature vector (block 526). The features in the feature vector identify a plurality of observed features in the result token that correspond to the pairing between one character in the result token and one or more corresponding characters in the non-standard token.

Process 500 identifies the operations that are performed on characters in the result token that generate the non-standard token once the features are extracted (block 528). Referring again to Table 1, some characters in the result token "EAST-BOUND" are also present in the non-standard token "EASTBND." Unchanged characters correspond to a single-character operation where an input character in the result token is associated with a character having an equivalent value in the non-standard token. The characters "OU" in the result token 616 map to a null character in the non-standard token 604.

As described above, each operation between the result token 616 and the non-standard token 604 corresponds to a vector of observation feature functions $g_i$ with corresponding operational parameters $\mu_i$. When one particular observation function is present in the training data pair, the corresponding value for $\mu_i$ is updated to indicate that the given observation feature function occurred in the training data. For example, one feature function $g_{E-E}$ describes the operation for converting the input character "E" in the result token 616 to the output character "E" in the non-standard token 604. The value of the corresponding operational parameter $\mu_{E-E}$ is updated when the operation corresponding to the function $g_{E-E}$ is observed in the training data. When one particular transition function $f_j$ is present between characters in the non-standard token 604, the value for the corresponding operational parameter $\lambda_j$ is updated (block 532). The updates to the operational parameter values are also made with reference to the feature vectors associated with each character in the result token. The weights of the values $\lambda_j$ for the transition functions $f_j$ are updated in a similar manner based on the identified transitions between features in the non-standard token.

In one embodiment, the CRF training process 500 uses the limited-memory Broyden-Fletcher-Goldfarb-Shanno (L-BFGS) algorithm and the identified pairs of non-standard tokens and corresponding standard tokens to calculate the parameters $\lambda_j$ and $\mu_i$ using the extracted features from the training data. The operational parameters $\lambda_j$ and $\mu_i$ are stored in a memory in association with the corresponding transition feature functions $f_j$ and observation feature functions $g_i$ (block 544). In system 100, the operational parameters $\lambda_j$ and $\mu_i$ are stored in the CRF model data 132 in the memory 112. The system 100 uses the generated CRF model data 132 to generate the non-standard tokens from standard tokens as described in process 200.

Figure 7:
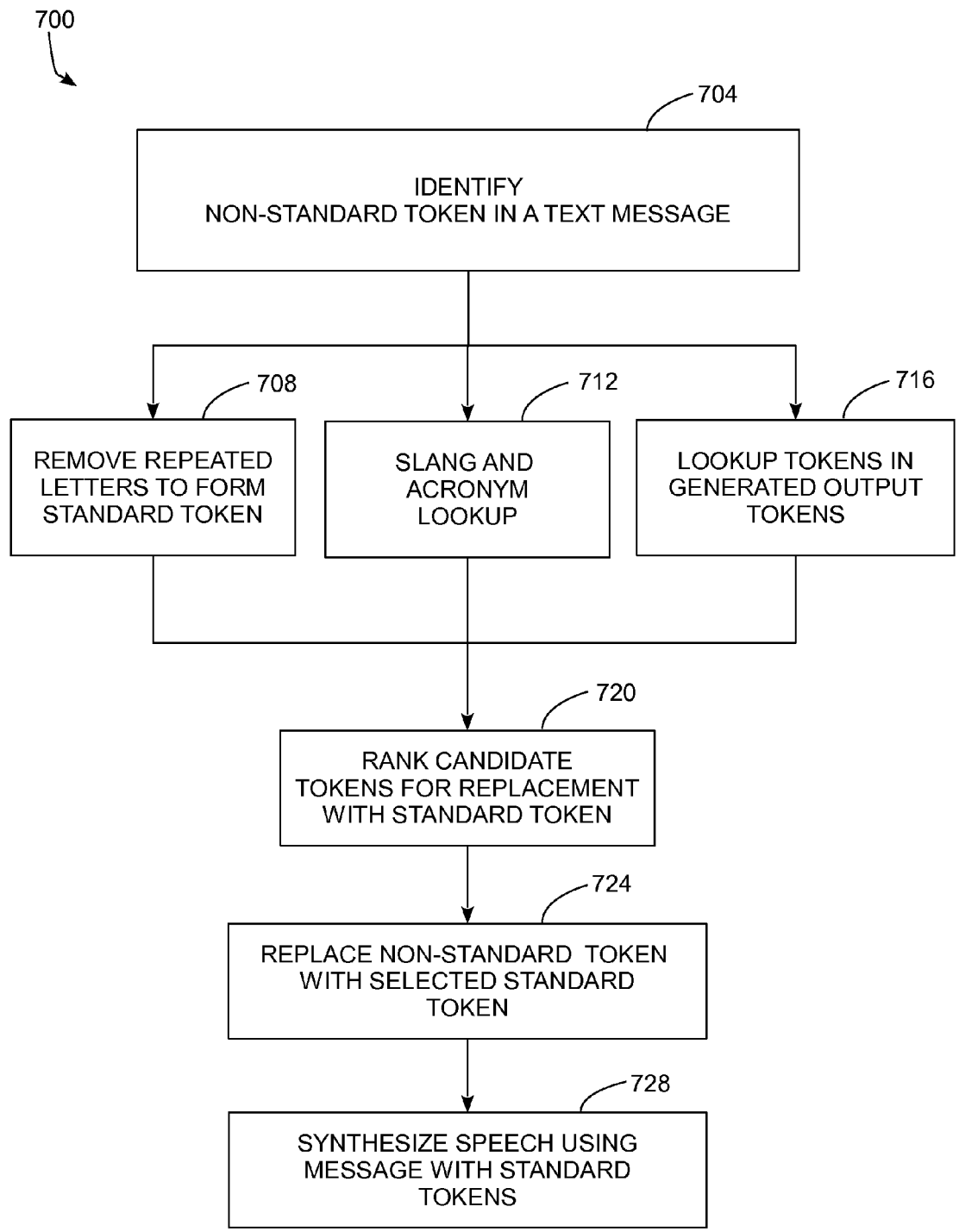
FIG. 7 is a block diagram of a process for replacing non-standard tokens in a text message with standard tokens and for generating synthesized speech corresponding to the text message.

FIG. 7 depicts a process 700 for replacement of a non-standard token in a text message with a standard token. System 100 as depicted in FIG. 1 is configured to perform process 700 and is referred to by way of example. Process 700 begins by identification of non-standard tokens in a text message (block 704). In system 100, the network module 112 is configured to send and receive text messages. Common forms of text messages include SMS text messages, messages received from social networking services, traffic and weather alert messages, electronic mail messages, and any electronic communication sent in a text format. The text messages often include non-standard tokens that the controller 104 identifies by identifying tokens that have values that do not match any of the standard tokens 124. In system 100, a non-standard token identification module 118 is configured to identify tokens in the text message and supply the tokens to the controller 104 for matching with the standard tokens 124.

Process 700 includes three sub-processes to identify a standard token that corresponds to the identified non-standard token. One sub-process removes repeated characters from a non-standard token to determine if the resulting token matches a standard token (block 708). Another sub-process attempts to match the non-standard token to slang tokens and acronyms stored in the memory (block 712). A third sub-process compares the non-standard token to the plurality of non-standard tokens that correspond to each of the standard tokens in the memory (block 716). The processes of blocks 708-716 can be performed in any order or concurrently. In system 100, the controller 104 is configured to remove repeated characters from non-standard tokens to determine if the non-standard tokens match one of the standard tokens 124. Additionally, slang and acronym terms are included with the standard tokens 124 stored in the memory 112. In an alternative configuration, a separate set of slang and abbreviation tokens are stored in the memory 112. Controller 104 is also configured to compare non-standard tokens in the text message to the non-standard tokens 128 to identify matches with non-standard tokens that correspond to the standard tokens 124.

Some non-standard tokens correspond to multiple standard tokens. In one example, the non-standard token "THKS" occurs twice in the set of non-standard tokens 128 in association with the standard tokens "THANKS" and "THINKS". Each of the standard tokens is a candidate token for replacement of the non-standard token. Process 700 ranks each of the candidate tokens using a statistical language model, such as a unigram, bigram, or trigram language model (block 720). The language model is a statistical model that assigns a probability to each of the candidate tokens based on a conditional probability generated from other tokens in the text message. For example, the message "HE THKS IT IS OPEN" includes the "HE" and "IT" next to the non-standard token "THKS." The language model assigns a conditional probability to each of the tokens "THANKS" and "THINKS" that corresponds to the likelihood of either token being the correct token given that the token is next to a set of known tokens in the text message. The standard tokens are ranked based on the probabilities, and the standard token that is assigned the highest probability is selected as the token that corresponds to the non-standard token.

Process 700 replaces the non-standard token with the selected standard token in the text message (block 724). In text messages that include multiple non-standard tokens, the operations of blocks 704-724 are repeated to replace each non-standard token with a standard token in the text message. The modified text message that includes only standard tokens is referred to as a normalized text message. In process 700, the normalized text message is provided as an input to a speech synthesis system that generates an aural representation of the text message (block 728). In system 100, the speech synthesis module 108 is configured to generate the aural representation from the standard tokens contained in the normalized text message. Alternative system configurations perform other operations on the normalized text message, including language translation, grammar analysis, indexing for text searches, and other text operations that benefit from the use of standard tokens in the text message.

Figure 8:
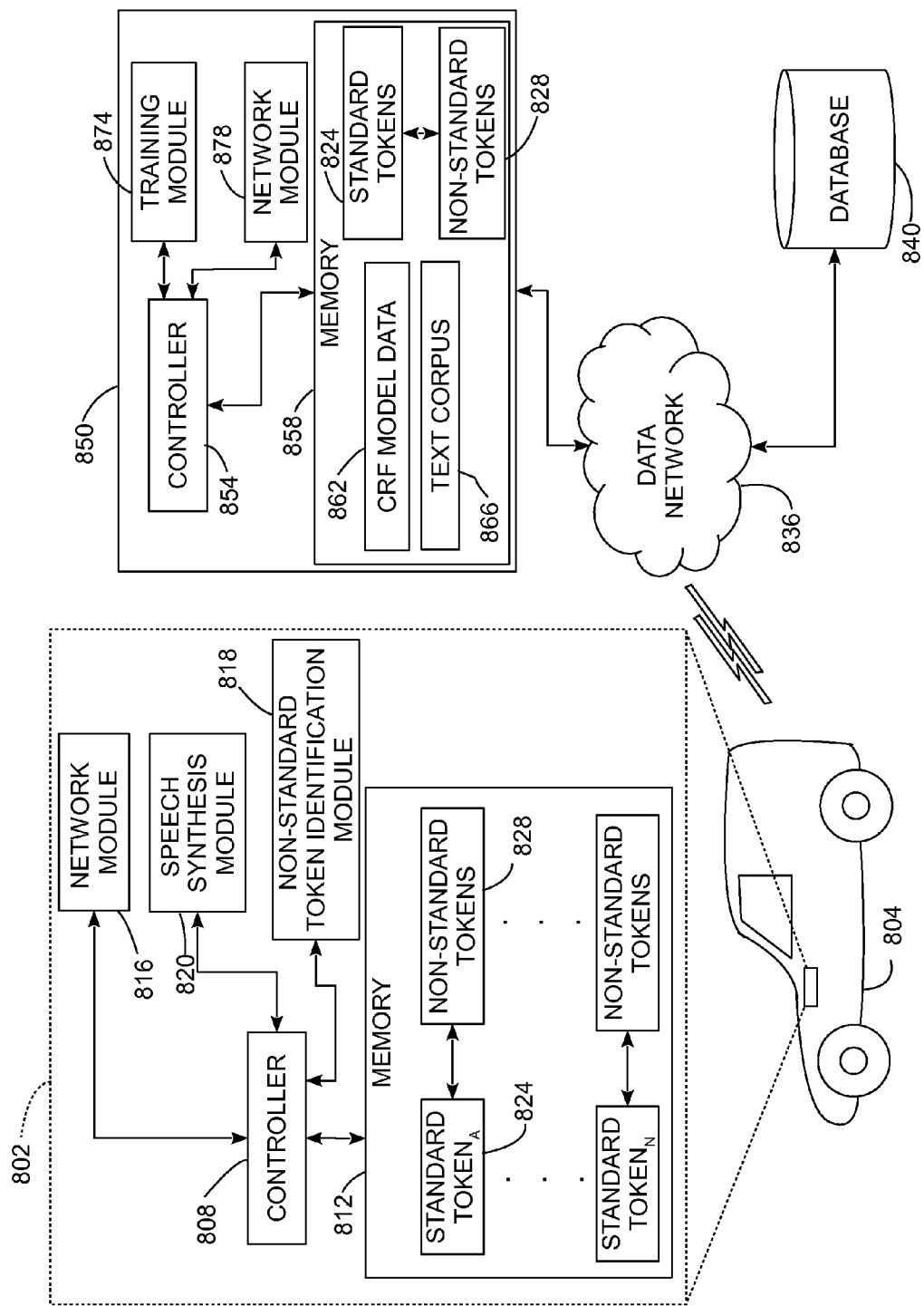
FIG. 8 depicts an alternative configuration of the system depicted in FIG. 1 that is configured for use in a vehicle.

FIG. 8 depicts an alternative configuration of the system 100 that is provided for use in a vehicle. A language analysis system 850 is operatively connected to a communication and speech synthesis system 802 in a vehicle 804. The language analysis system 850 generates a plurality of non-standard tokens that correspond to a plurality of standard tokens, and the system 802 is configured to replace the non-standard tokens in text messages with the standard tokens prior to performing speech synthesis.

The language analysis system 850 includes a controller 854, memory 858, training module 874 and network module 878. The memory 858 stores CRF model data 862, text corpus 866, a plurality of standard tokens 824 and non-standard tokens 828. The controller 854 is configured to generate the CRF model data using process 500. In particular, the network module 878 sends and receives database queries from a database 840, such as an online search engine, that is communicatively connected to the network module 878 through a data network 836. The controller 854 operates the training module 874 to generate training data for the CRF model using the text corpus 866. The controller 854 and training module 874 generate CRF model data 862 using the training data as described in process 500. The language analysis system 850 is also configured to perform process 200 to generate the non-standard tokens 828 from the standard tokens 824 using a CRF model that is generated from the CRF model data 862. The standard tokens 824 and corresponding non-standard tokens 828 are provided to one or more in-vehicle speech synthesis systems, such as the communication and speech synthesis system 802 via the network module 878.

A vehicle 804 includes a communication and speech synthesis system 802 having a controller 808, memory 812, network module 816, non-standard token identification module 818, and speech synthesis module 820. The memory 812 includes the plurality of standard tokens 824 that are each associated with a plurality of non-standard tokens 828. The system 802 receives the standard tokens 824 and associated non-standard tokens 828 from the language analysis system 850 via the data network 836. The controller 808 is configured to replace non-standard tokens with standard tokens in text messages from the standard tokens 824 in the memory 812. The system 802 receives the standard tokens 824 and associated non-standard tokens 828 from the language analysis system 850 via the network module 816. System 802 identifies non-standard tokens in text messages using the non-standard token identification module 818 and generates synthesized speech corresponding to normalized text messages using the speech synthesis module 820 as described above in process 700. While the system 802 is depicted as being placed in vehicle 804, alternative embodiments place the system 802 in a mobile electronic device such as a smart phone.

In the configuration of FIG. 8, the language analysis system is configured to update the text corpus 866 continually, using selected text messages that are sent and received from multiple communication systems such as system 802. Thus, the text corpus 866 reflects actual text messages that are sent and received by a wide variety of users. In one configuration, the text corpus 866 is configured to receive updates for an individual user to include messages with non-standard tokens that are included in text messages sent and received by the user. For example, the text corpus 866 can be updated using text messages sent and received by the user of vehicle 804. Consequently, the text corpus 866 includes non-standard tokens more typically seen by the individual user of the vehicle 804 and the non-standard tokens 828 are generated based on text messages for the individual user. The system 850 is configured to store text corpora and generate individualized non-standard token data for multiple users.

In operation, the language analysis system 850 is configured to update the CRF model data 862 periodically by performing process 500 and to revise the non-standard tokens 828 using the CRF data model. The communication and speech synthesis system 802 receives updates to the standard tokens 824 and non-standard tokens 828 to enable improved speech synthesis results.

Figure 10:
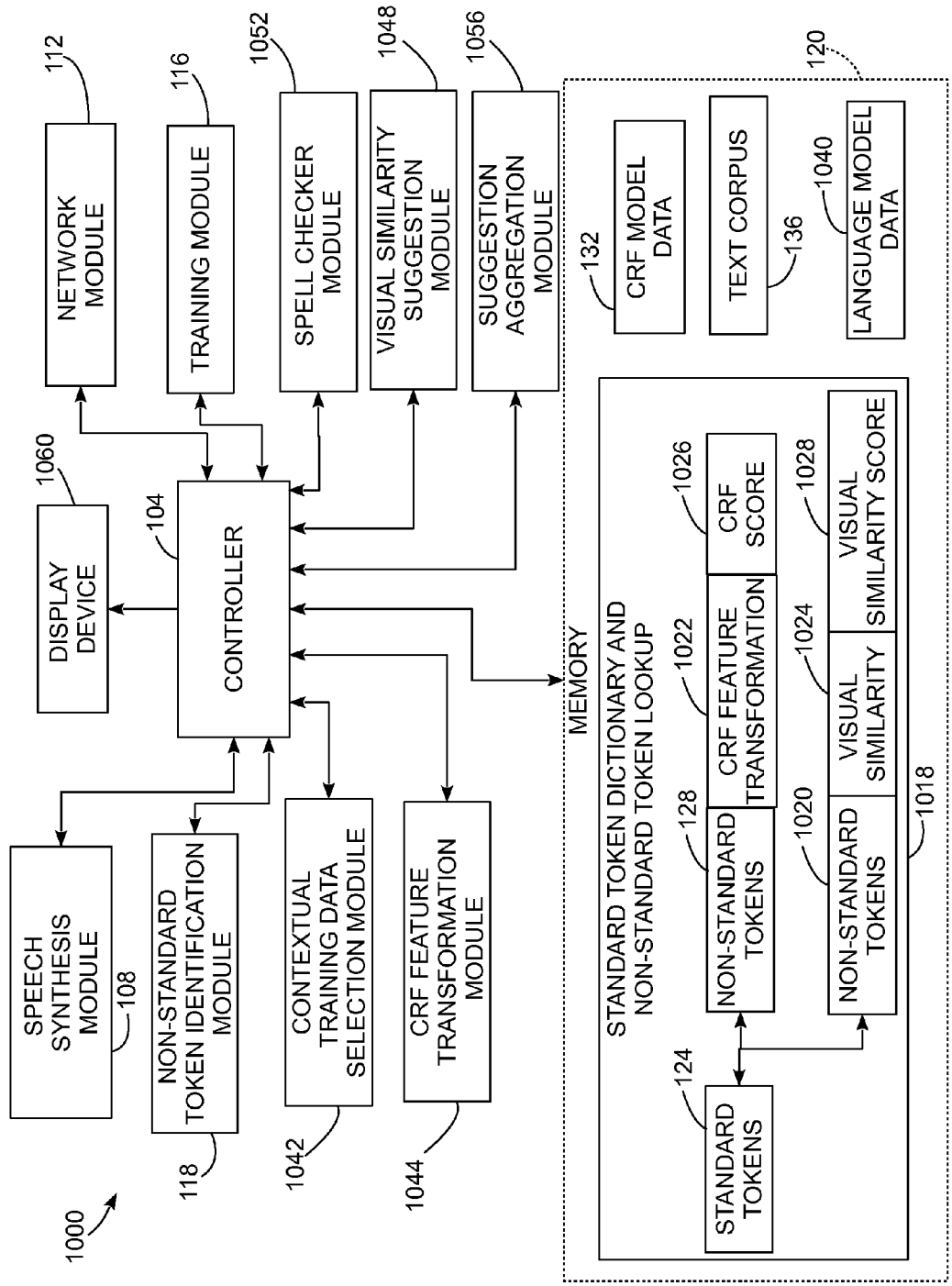
FIG. 10 is a schematic diagram of a system for identification of standard tokens that correspond to non-standard tokens in text using a combination of multiple identification techniques and for generation of an output that includes the identified standard tokens.

FIG. 10 depicts another embodiment of a token processing system 1000 that is configured to identify non-standard tokens in communication messages and to generate an output including at least one suggested standard token to replace the non-standard token. In different hardware configuration the system 1000 is implemented using a personal computer (PC) device, a mobile electronic device including smartphones and tablet computers. In another embodiment, the system 1000 is embodied as an in-vehicle information system in a configuration similar to the depiction of FIG. 8 where a portion of the functionality of the system 1000 is performed by control hardware and software in a vehicle that is communicatively connected to an external computing system through a wireless data network. The system 1000 includes the controller 104, speech synthesis module 108, network module 112, training module 116, non-standard token identification module 118, and memory 120 that are described above in conjunction with the system 100 of FIG. 1. The system 1000 further includes a contextual training data selection module 1042, CRF feature transformation module 1044, visual similarity suggestion module 1048, spell checker module 1052, suggestion aggregation module 1056, and a user interface input and display device 1060.

In the system 1000, the contextual training data selection module 1042 includes stored program instructions that the controller 104 executes to select the standard token and non-standard token training pairs for generation of the CRF model data 132 using the training module 116 as described above in the process 500. The controller 104 uses the contextual training data selection module 1042 to limit the training pairs that are used for training the CRF model to improve the accuracy of the non-standard tokens 128 that are generated for the standard tokens 124 using the CRF model.

In the system 1000, the CRF feature transformation module 1044 includes software instructions that the controller 104 executes to generate non-standard tokens 128 that are associated with the standard tokens 124 in the memory 120 using the trained CRF model data 132. The controller 104 uses the CRF feature transformation module 1044 in conjunction with the generated CRF model parameter data 132 to generate the non-standard tokens 128 from the features that are included in the standard tokens 124 as described above in the process 200.

In addition to the CRF feature transformation module 1044, the system 1000 generates associations between non-standard tokens and standard tokens using the visual similarity suggestion module 1048 and the spell checker module 1052. The visual similarity suggestion module 1048 includes software instructions that the controller 104 executes to identify standard tokens in the text corpus data 136 that include features with a high visual similarity to an identified non-standard token. The controller 124 stores the generated associations between the non-standard tokens and the standard tokens in the memory 120, with the non-standard tokens 1020 corresponding to the output of the visual similarity suggestion module 1048 being associated with the standard tokens 124. In the system 1000, the spell checker module 1052 includes one or more prior art spell checking software programs that generate suggestions for the standard tokens 124 in response to receiving a non-standard token with characters that do not match the spelling of the standard tokens in the dictionary 1018.

During operation, the system 1000 generates output for a user and receives input from the user using one or more user interface devices. As used herein, the term "user interface device" refers to any device or combination of devices that generate an output of text data that is perceptible to a human user and receive input corresponding to commands and selections from the human user. In the system 1000, the user interface includes the speech synthesis module 108 and the user input and display device 1060. In the embodiment of FIG. 10, the user input and display device 1060 includes a graphical display device, such as an LCD panel or other flat panel or projection display device, which generates graphics and text, including the text in communication messages received by the system 1000. The user input and display device 1060 includes a touchscreen interface, keypad, or other input device that enables the user to enter commands and other data. For example, in one operating mode the system 1000 presents a list or other graphical display including one or more standard tokens that are suggested for replacement of a non-standard token in a communication message. The system 1000 receives a touch input or other selection input using the input device in the user interface through the input and display device 1060 to record the selected standard token that the user selects from the suggested tokens. In another operating mode, the controller 104 receives text communication messages and presents an audible output corresponding to the text data in the communication messages using the speech synthesis module 108. The audible output includes one or more standard tokens that are used to replace a non-standard token during speech synthesis.

The memory 120 in the system 1000 stores the CRF model data 132 that the controller 104 generates using the training module 116 and the text corpus data 136. The memory 120 stores a language model 1040 for a language that corresponds to the data in the text corpus 136. For example, if the text corpus 136 includes English and non-standard token variants of English, then the language model data 1040 represent, for example, a bigram or trigram model of English terms. The language model data 1040 also include data corresponding to the phonetic similarity between characters and combinations of characters in the language. For example, in English the letter "c" and the letter "k" generate similar audible sounds under certain contexts, and the letter "f" and the letters "ph" also generate similar audible sounds in certain contexts. The language model data 1040 stores data correspond to phonetic similarities for use in generating suggestions for phonetically similar features in standard tokens that correspond to features in non-standard tokens. The system 1000 uses a predetermined language model that is generated using techniques known to the art.

The memory 120 also stores a standard token dictionary and non-standard token lookup table 1018. The dictionary data in the table 1018 include the standard tokens 124 corresponding to standard words in one or more predetermined languages, such as English. The lookup table 1018 also stores associations between the standard tokens 124 and non-standard tokens 128 that the controller 104 and CRF feature transformation module 1044 generate as described above in the process 200. The lookup table 1018 includes a CRF feature transformation tag 1022 that identifies the CRF feature transformation module 1044 as the source of the association between the non-standard token 128 and the standard token 124. The lookup table 1018 also includes the CRF score 1026 that is associated with the association between the standard token 124 and non-standard tokens 128. The CRF score 1026 is the conditional probability $p(t_i|s_i)$ that is identified during the generation of the non-standard token using the CRF model as described above during process 200. The lookup table 1018 also stores associations between previously identified non-standard tokens 1020 and the standard tokens 124 that the controller 104 generates using the visual similarity suggestions module 1048. The lookup table 1018 stores a visual similarity suggestion identifier tag 1024 to identify the visual similarity suggestion module 1048 as the source of the association between the non-standard token 1024 and the standard token 124. The table 1018 also includes a visual similarity score 1028, which is the conditional probability $p(t_i|s_i)$ that is identified during the generation of the non-standard token using the visual similarity suggestion module 1048.

During operation, the system 1000 receives text data that include one or more non-standard tokens. As described above, the non-standard tokens often include slang terms and spelling variations for existing terms that are popular within a limited context, such as in the context of a social network service or text messaging communication system. The system 1000 is configured to generate an output of the text including at least one suggestion for a standard token that replaces the non-standard token using one or more user interface devices including the user interface input and display 1060 and the speech synthesis module 108. In the system 1000, the CRF feature transformation module 1044, visual similarity module 1048, and the spell checker module 1052 each generate suggested standard tokens for the identified non-standard token. The suggestion aggregation module 1056 includes software instructions that the controller 104 executes to select one or more of the suggested standard tokens from the sets of standard tokens that are identified by each of the modules 1044-1052. The controller 104 generates an output for text that includes the non-standard token using one or more of the standard tokens that are selected with the suggestion aggregation module 1056. In one configuration, the system 1000 generates a visual output using the display device 1060, which is an LCD display screen, head-up display, or any other video output device. The visual output can include a list of one or more suggested standard tokens that correspond to the non-standard token, or the controller 104 selects a single standard token to replace the non-standard token in the displayed text. In another configuration, the controller 104 generates synthesized speech for one or more of the standard tokens using the speech synthesis module 108.

The system 1000 performs text normalization through identification of standard tokens that correspond to non-standard tokens. The system 1000 generates an output using the standard tokens to enable a user to identify a non-standard token more easily. In an embodiment where the system 1000 generates audible output using the speech synthesis module 108, the normalization process enables the speech synthesis module to generate output using a standard token using a predetermined speech synthesis model to generate an accurate audible output. The system 1000 is referred to as a "broad coverage" text normalization system because the CRF transformation suggestion module 1044, visual similarity suggestion module 1048, and the spell checker module 1052 each generate suggested standard tokens in response to identification of a non-standard token.

Figure 11:
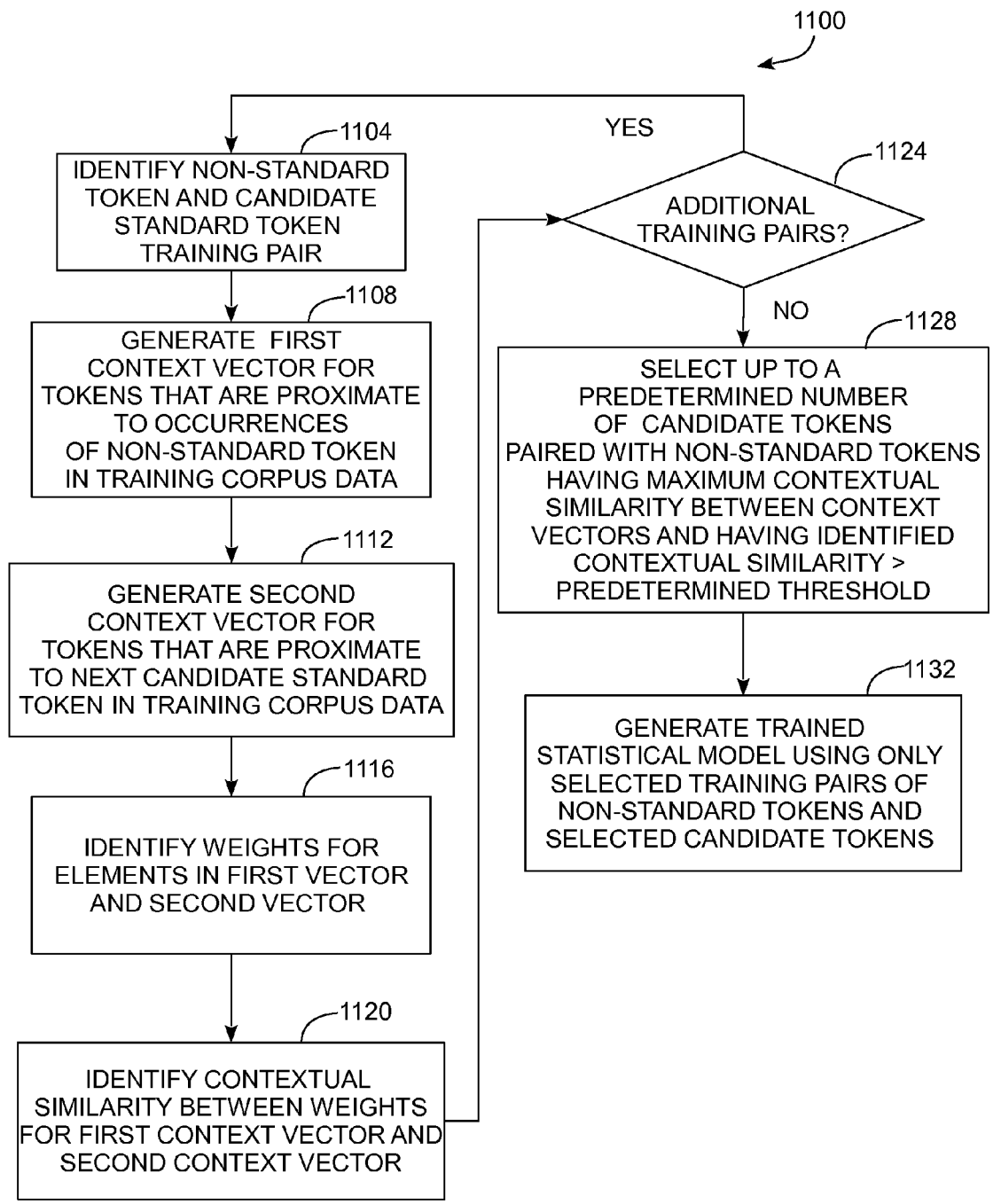
FIG. 11 is a block diagram of a process for selection of standard tokens and non-standard tokens for generation of a feature transformation model.

As described above, the CRF model is generated using a set of non-standard tokens that are associated with standard tokens in a predetermined dictionary. An individual non-standard token that is associated with a standard token is also referred to as a training pair. As described above in the process 500, the training pairs for training the CRF model are retrieved from an online database, such as a search engine, social networking service, or other online resources including one or more websites. The effective quality of the CRF and the non-standard tokens that are generated from the standard tokens using the CRF model are affected by the accuracy and relevance of the training pair data that are used to generate the CFR model data. FIG. 11 depicts a process 1100 for identifying if training pairs that are identified in data retrieved from an online database or other sources should be used for generation of the CRF or another statistical language model such as a Hidden Markov Model (HMM). In the description below, a reference to the process 1100 performing a function or action refers to functions or actions that are performed by one or more control devices, such as digital controllers that execute stored program instructions to perform the function or action. The process 1100 is described in conjunction with the system 1000, including the controller 104 and contextual training data selection module 1042, of FIG. 10 for illustrative purposes.

Process 1100 begins with identification of a non-standard token and a corresponding standard token candidate corresponding to the non-standard token (block 1104). In the system 1000, the non-standard token is identified as an OOV token in the text corpus 136 that does not directly correspond to any of the standard tokens 124 in the dictionary 1018. In one embodiment, the identified standard token is retrieved from text that is retrieved from an online database or search engine, as described in the process 500. In another embodiment, a human operator enters a suggested standard token that corresponds to the non-standard token. In the process 1100, both the standard token and non-standard token have multiple occurrences in the text corpus data, such as the text corpus data 136 in the system 1000.

In process 1100, both the non-standard token and the standard token occur multiple times throughout the text corpus. The controller 104 generates a first context vector that includes tokens in close proximity to the non-standard token in the text corpus (block 1108). In one embodiment of the process 100, the first context vector includes tokens that occur most frequently either immediately before or immediately after the non-standard token in the text corpus. For example, using the non-standard token "kuz," a sample text string in the text corpus 136 is "there kuz I." The tokens "there" and "I" are located immediately before and after, respectively, the non-standard token "kuz." The context vector includes a predetermined number of entries for contextual tokens that are proximate to the non-standard token. In one embodiment of the process 1100, the controller 104 identifies up to one hundred entries in the first contextual vector for the non-standard token. The controller 104 adds contextual terms that appear with the greatest frequency in proximity to the non-standard token in the text corpus to the contextual vector.

Process 1100 continues with generation of a second context vector for the standard candidate token in the training pair (block 1112). In the system 1000, the controller 104 generates the second context vector using tokens in the text corpus 136 that are located proximate to the candidate token in a similar manner to the generation of the first context vector. For example, if the candidate standard token is "because," then the controller 104 identifies tokens in the text corpus proximate to the term because, such as the string "fine because even," where "fine" and "even" are the two tokens that appear before and after, respectively, the standard token "because." During the process 1100, the controller 104 generates the second context vector with the same length as the first context vector.

Process 1100 continues as the controller 104 identifies weight values for the terms in the first and second context vectors (block 1116). In one embodiment, the weight $w_{i,k}$ for a context token $t_k$ is identified using the following equation:

$$w_{i,k} = \frac{TF_{i,k}}{TF_i}\left(\log\left(\frac{N}{DF_K}\right)\right)$$

where $TF_{i,k}$ is the number of times that the context token $t_k$ occurs in context with the non-standard token in the first vector or standard token in the second vector, $TF_i$ is the total number of occurrences for the non-standard token in the first vector or standard token in the second vector, N represents a total number of distinct messages in the text corpus, and $DF_K$ is the number of distinct messages where the context term $t_k$ occurs at least one time. The number of distinct messages in the text corpus corresponds to, for example, a number of distinct email messages in a large body of email messages, a number of distinct postings made to social networking services, a number of distinct text messages sent through SMS or an instant messaging service, or a combination thereof.

Process 1100 continues as the controller 104 identifies a numeric contextual similarity value corresponding to a similarity between the weight values identified for elements in the first context vector and the second context vector (block 1120). The contextual similarity value is an aggregate value corresponding to an identified similarity between the first context vector and the second context vector, where the first vector $v_i$ includes a total of n weight values $w_i$, and the second vector $v_k$ includes a total of n weight values $w_j$. The contextual similarity is identified as a cosine similarity using the following equation:

$$ContextSim(vi, vj) = \frac{\sum_{k=1}^{n}((w_{i,k})(w_{j,k}))}{\left(\sqrt{\sum_{k=1}^{n} w_{i,k}^2}\right)\left(\sqrt{\sum_{k=1}^{n} w_{j,k}^2}\right)}.$$

Process 1100 continues as the controller 104 identifies the contextual similarity between the non-standard tokens and standard tokens in additional training pairs (block 1124) using the processing described above with reference to the blocks 1104-1120 in FIG. 11. After identifying the contextual similarity for the training pairs (block 1124), process 1100 continues with selection of up to a predetermined maximum number of candidate tokens for use in generating the statistical model (block 1128). In one embodiment, the controller 104 selects training pairs starting with the highest contextual similarity values and continuing in order of highest contextual similarity until either the predetermined number of training pairs is identified or the training pairs have a contextual similarity that is below a predetermined threshold. In one embodiment, the controller 104 identifies up to 5,000 training pairs if the contextual similarity is greater than a numeric value of 0.0003. Alternative configurations use a greater or lesser number of training pairs with different contextual similarity thresholds to use a larger or smaller number of training pairs for generation of the statistical model.

After selection of the training pairs, process 1110 concludes with generation of a statistical model using only the training pairs that are selected based on the contextual similarity (block 1132). For example, in the system 1000 the model parameter generation process described above in conjunction with the blocks 524-532 in FIG. 5 can receive only the selected training pairs of non-standard and standard tokens for the generation of operational parameters in the CRF model data 132. The selected training parameters can also be used for training Hidden Markov Models or other appropriate statistical models that are used to generate non-standard token suggestions from standard tokens 124. The data corresponding to the generated statistical model, such as the CRF model parameter data 132, are stored in the memory 120 for use in generating associations between standard tokens and non-standard tokens that are identified in the text data of additional communication messages that the system 1000 receives during operation.

Figure 14:
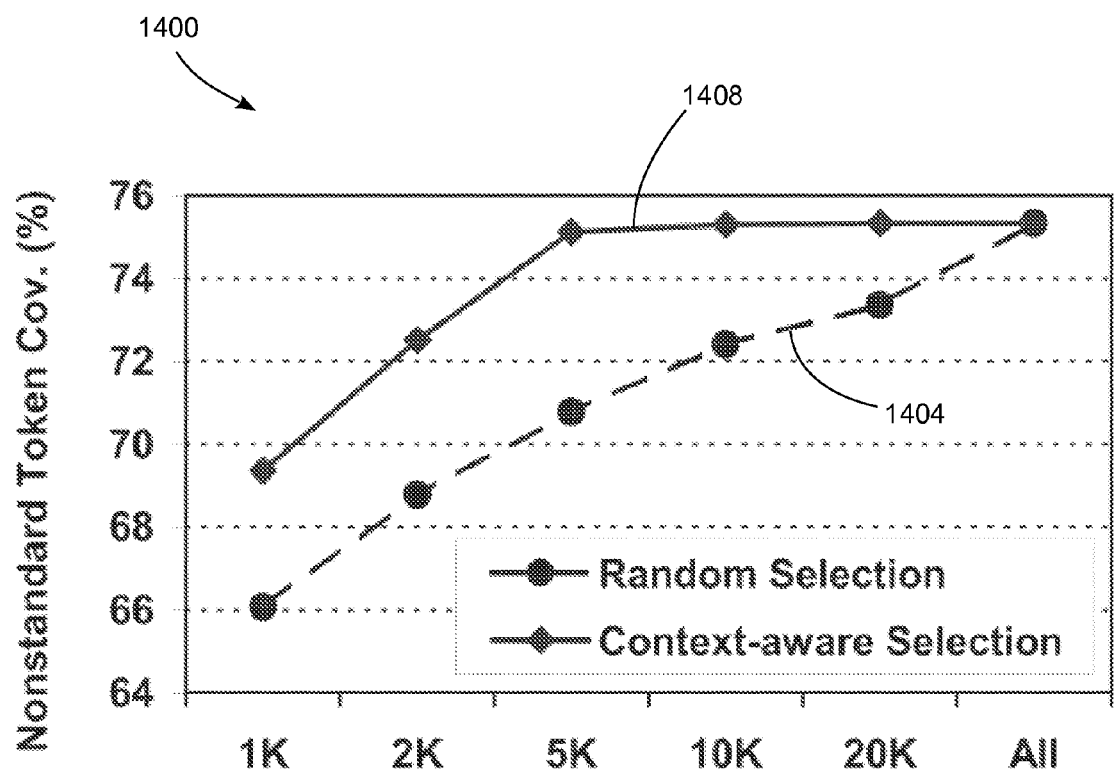
FIG. 14 is a graph depicting the percentage of non-standard tokens in a text corpus that are generated using a conditional random field model that is generated using different sets of training data.

In the process 1100, the selection of training pairs with reference to the context of surrounding tokens in the text corpus data enables the generation of CFR model parameters 132 that enable more accurate transformation of the features in the standard tokens 124 to generate the non-standard dictionary tokens 128. FIG. 14 includes a graph 1400 of the total coverage percentage for the non-standard tokens in the text corpus data that the CRF feature transformation module 1044 generates when the CRF model data 132 are trained with random training pairs (plot 1404) and training pairs that are selected based on contextual similarity as described in process 1100 (plot 1408). The graph 1400 depicts the coverage results using the CRF model data when trained with increasing numbers of training pairs along the x-axis of the graph 1400 ranging from 1,000 training pairs to a total of 46,288 pairs. As indicated in the graph 1400, the system 1000 can effectively generate the CRF model parameter data 132 to generate suggestions for over 75% of the non-standard tokens in the text corpus using a comparatively small selection of the total number of training pairs. For example, using the contextual training data selection module 1042, the controller 104 generates the CRF model with parameters that provide over 75% coverage of the non-standard tokens using 5,000 training pairs in the plot 1408. Using only a random selection of the total number of training pairs, however, requires use of nearly all of the training pairs to generate similar coverage, as depicted in the plot 1404. Thus, the process 1100 enables the system 1000 to generate the CRF model parameter data 132 in a more efficient manner.

Figure 12:
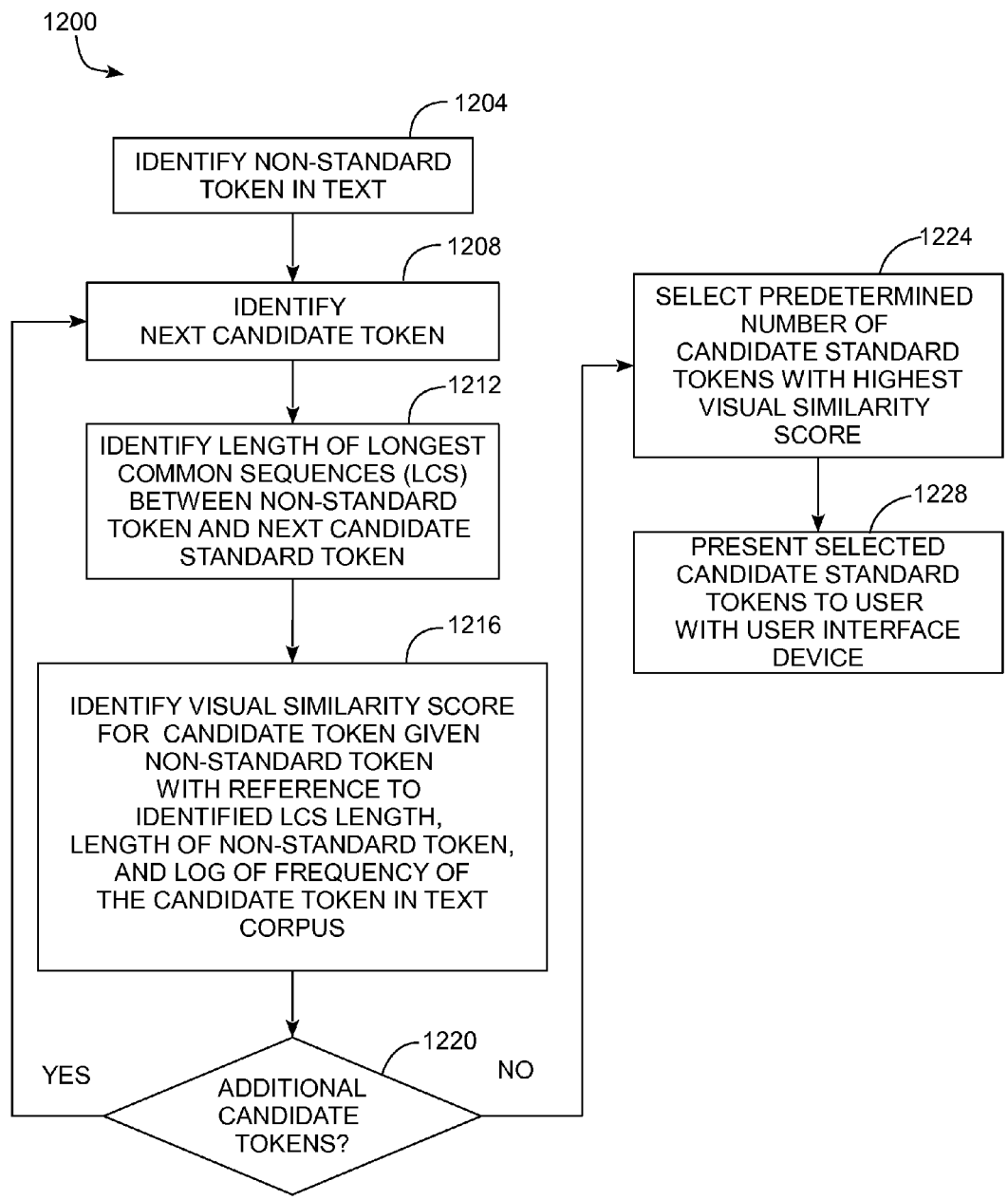
FIG. 12 is a block diagram of a process for identification of standard tokens in a text corpus that includes features visually similar to features in a non-standard token.

FIG. 12 depicts a process 1200 for identification of candidate standard tokens that correspond to non-standard tokens based on a visual similarity between the features in the tokens. The visual similarity between the non-standard token and other similar standard tokens in the text corpus is referred to as "visual priming." Visual priming refers to the propensity of a human user of an online communication service who sees a large number of similar standard tokens during use of the service to generate non-standard tokens that are visually similar modifications of tokens seen in earlier messages using the communication service. For example, the user of a microblogging service who views a large number of short messages from other users tends to copy non-standard tokens that are seen in other messages or generates new non-standard tokens that are modifications of existing standard tokens in existing messages. Many of the non-standard tokens are visually similar to existing tokens, which is to say that the non-standard tokens include some common sequences of characters with existing tokens, while also including characters and character sequences that differ from the standard token. In the description below, a reference to the process 1200 performing a function or action refers to functions or actions that are performed by one or more control devices, such as digital controllers that execute stored program instructions to perform the function or action. The process 1200 is described in conjunction with the system 1000, including the controller 104 and visual similarity suggestion module 1048, of FIG. 10 for illustrative purposes.

Process 1200 begins with identification of a non-standard token in text (block 1204). In one configuration, the controller 104 identifies non-standard tokens in the text corpus data 136. In another configuration, text data that are received as part of a communication message through the network module 112 include the non-standard token. After identification of the non-standard token, the process 1200 continues with identification of at least one candidate standard token that can correspond to the non-standard token (block 1208). In the system 1000, the controller 104 identifies standard tokens 124 that are stored in the memory 120. In one embodiment, the controller 104 limits the selection of candidate tokens to standard tokens that share the first feature or a first group of features in common with the non-standard token or that are phonetically similar to the first letters in the non-standard token. For example, using the example non-standard token of "kuz," the controller 104 selects candidate standard tokens that begin with the letter "k" and phonetically similar letter "c" in the dictionary 1018. Standard tokens that begin with different letters are not selected as candidate tokens to limit the total number of candidate tokens for the non-standard token. The phonetic similarity data for a given language, such as English, is stored with the language model data 1040 in the memory 120.

After selection of the next candidate standard token for the non-standard token, process 1200 continues as the controller 104 identifies the longest common sequence of characters in the non-standard token and the candidate standard token (block 1212). The controller 104 identifies the longest common sequences of characters between the non-standard token and the candidate token in the same manner as described above in the process 500 of FIG. 5. In the process 1200, the controller 104 also identifies the length of the longest common sequence of characters. For example, using the non-standard token "ppl," the standard token "people" shares a longest common character sequence of "pl", with a longest common sequence length of two characters.

Process 1200 continues with identification of a visual similarity score between the non-standard token and the candidate standard token (block 1216). In the system 1000, the controller 104 identifies the visual similarity score using the following equation:

$$VisualPrime(s_i \mid t_i) = \frac{len\ (LCS(t_i, s_i))}{len(t_i)} \times \log(TF(s_i)),$$

where $s_i$ is the candidate standard token, $t_i$ is the non-standard token, len $(LCS(t_i, s_i))$ is the length of the longest common sequence of characters between $t_i$ and $s_i$, len($t_i$) is the number of characters in the non-standard token, and $TF(s_i)$ is the frequency of the standard token $s_i$ in the text corpus data 136, which corresponds to the total number of occurrences of the standard token $s_i$ in the text corpus data.

Process 1200 continues for additional candidate tokens (block 1220) with identification of the visual similarity scores for each of the candidate standard tokens that are identified for the non-standard token as described above with reference to the processing of blocks 1208-1216. Once the controller 104 identifies the visual similarity score for each of the candidate standard tokens (block 1220), then the controller 104 selects a predetermined number of the candidate tokens with the highest visual similarity scores (block 1224). As described below, the visual similarity scores correspond to conditional probability values that the standard candidate token corresponds to the non-standard token when the non-standard token is identified in text data. In some embodiments, controller 104 selects the single candidate token with the greatest visual similarity score to correspond to the non-standard token.

During process 1200, the system 1000 presents one or more of the identified candidate standard tokens that correspond to the non-standard token to the user with a user interface device, including the input and display device 1060 and the speech synthesis module 108 (block 1228). In the system 1000, the controller 104 stores the association between the non-standard token and the selected standard tokens in the token lookup table 1018. For example, the non-standard tokens 1020 are associated with standard tokens 124 in FIG. 10. In the system 1000, the controller 104 also stores the visual similarity identifier 1024 in association with the non-standard tokens 1020 to identify that the controller 104 used the visual similarity suggestion module 1048 to generate the non-standard tokens 1020. The controller 104 presents one or more of the identified standard tokens to the user with the user interface device. In one configuration, the user interface and display device 1060 generates a graphical list including the identified standard tokens in association with the non-standard token, and the user selects one of the standard tokens from the list to use as a replacement for the non-standard token using an input device. In another configuration, the controller 104 presents a display of the candidate token with the highest visual similarity score to the user as a replacement for the non-standard token. In another configuration, the controller 104 selects one standard token with the highest visual similarity score to the non-standard token and generates a speech-synthesized output using the speech synthesis module 108, or displays one or more of the selected candidate tokens using the output display device 1060.

As described above, the system 1000 includes multiple hardware and software components that enable identification of a standard token in response to identification of a non-standard token in text data. The controller 104 generates the CRF model data 132 with the training module 116 using the data in the text corpus 136, and the selected training pairs of non-standard and standard tokens. The controller 104 then applies the CRF model parameters to identify transformation to features in the standard tokens 124, and the lookup table 1018 stores the non-standard tokens 128 that are associated with the CFR transformation tag 1022. As described above in FIG. 12, the controller 104 also applies the visual similarity suggestion module 1048 to non-standard tokens in conjunction with the standard tokens 124 and the text corpus 136 to generate additional associations between the standard tokens 1020 and non-standard tokens 1020 in response to identifying visual similarity between the standard tokens and corresponding non-standard tokens. The system 1000 further includes a spellchecker suggestion module 1052 that applies one or more prior-art spell checking methods to non-standard tokens and generates suggested standard tokens for the non-standard tokens using the prior art spell-checking methods.

In the system 1000, the controller 104 is configured to identify one or more standard tokens that correspond to a non-standard token using the outputs generated from each of the CRF feature transformation module 1044, visual similarity suggestion module 1048, and spell checker module 1052. The controller 104 uses the suggestion aggregation module 1056 to generate an output of one or more standard tokens that are generated by at least one of the modules 1044, 1048, and 1052. In one mode of operation, the system 1000 generates an output including a plurality of standard tokens that may correspond to the non-standard token, and a user of the system 1000 selects one of the generated standard tokens. In another mode of operation, the system 1000 generates an output including a single selected standard token that corresponds to the non-standard token.

Figure 13:
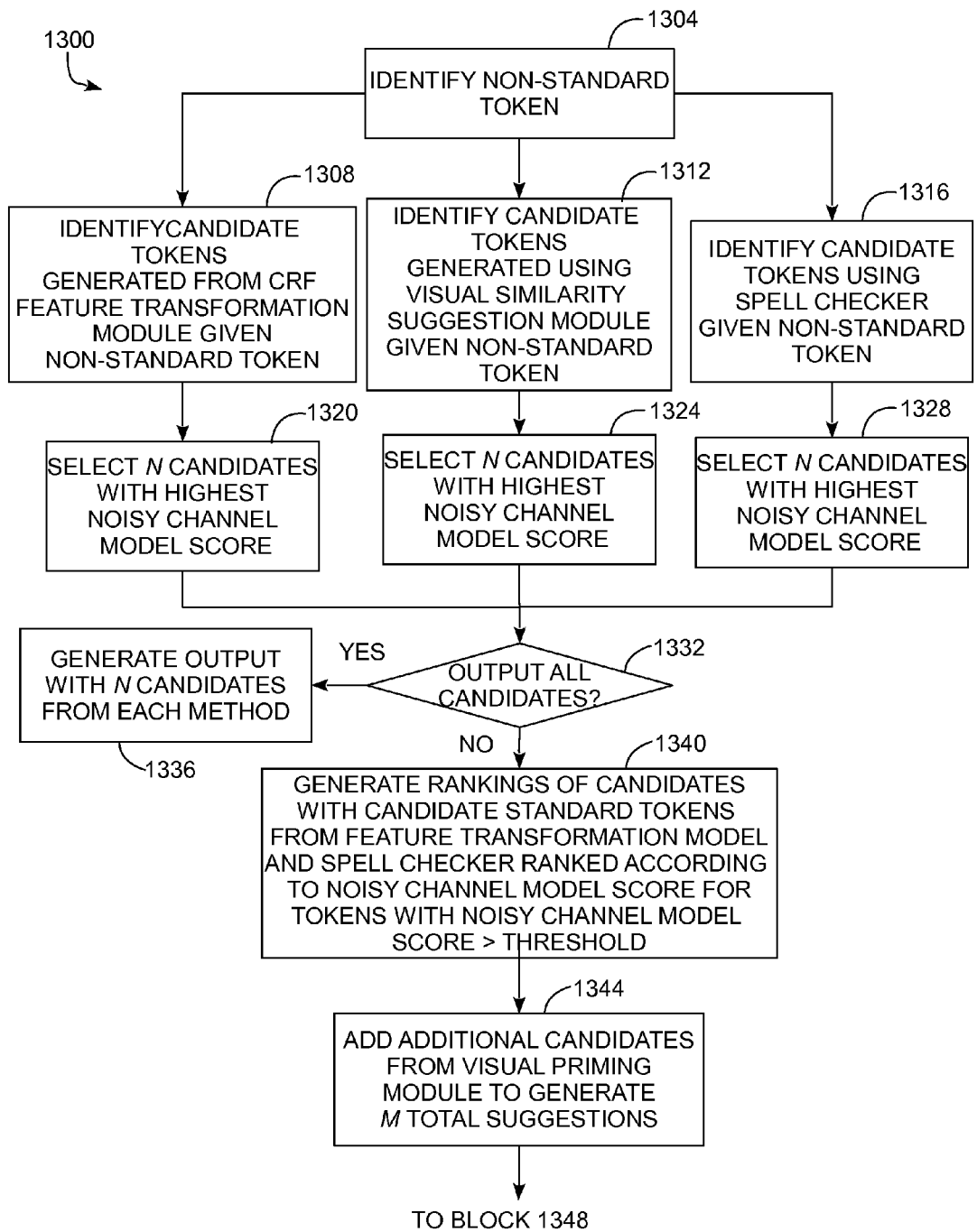
FIG. 13 is a block diagram of a process for identification of one or more standard tokens that correspond to a non-standard token using multiple text normalization techniques.
Figure 13:
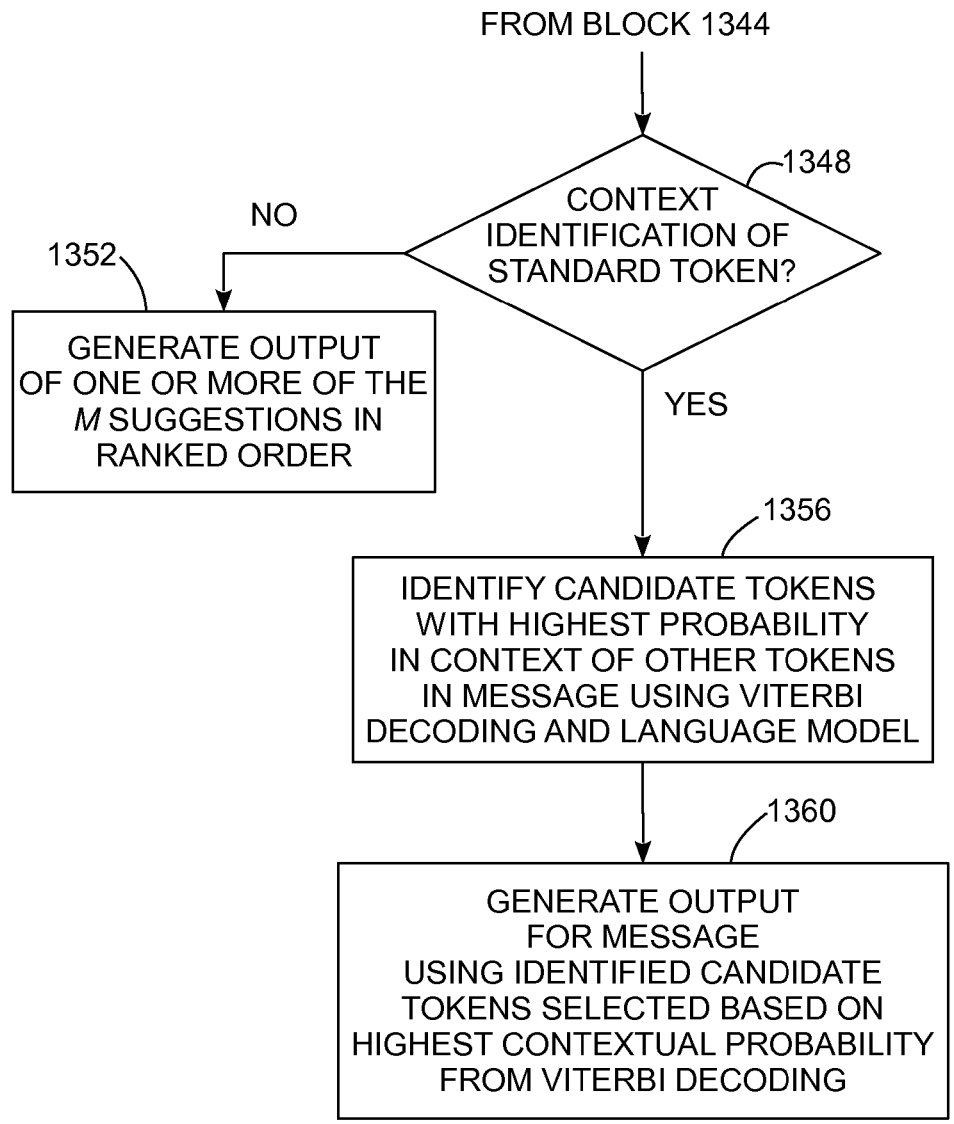

FIG. 13 is a diagram of a process 1300 for generation of a plurality of standard tokens that correspond to a non-standard token using the associations between non-standard tokens and standard tokens that are generated using multiple methods for standard token suggestion. In the description below, a reference to the process 1300 performing a function or action refers to functions or actions that are performed by one or more control devices, such as digital controllers that execute stored program instructions to perform the function or action. The process 1300 is described in conjunction with the system

1000 of FIG. 10, including the controller 104 and suggestion aggregation module 1056, for illustrative purposes.

Process 1300 begins with identification of a non-standard token in text (block 1304). In The system 1000, the controller 104 identifies a non-standard token in text for a communication message that is received through the network module 112. Examples of communication messages include SMS text messages, emails, instant messages, posts made to social networks, and the like.

During the process 1300, the system 1000 identifies one or more suggested candidate standard tokens for the non-standard token using results generated by each of the CRF feature transformation module 1044 (block 1308), visual similarity suggestion module 1048 (block 1312), and spell checker module 1052 (block 1316). The CRF feature transformation module 1044 generates the non-standard tokens 128 in the memory 128, and the controller 104 identifies standard tokens 124 with the corresponding non-standard token 128. The visual similarity suggestion module 1048 identifies the candidate tokens in response using the non-standard token as an input, and optionally stores the non-standard token 1020 in the memory 120 in association with the candidate standard token 124. If the system 1000 has identifies the non-standard token in earlier text messages, then the controller 104 optionally uses the stored associations between the non-standard tokens 1020 and the standard candidate tokens 124 from the output of the virtual similarity suggestion module 1048. The spell checker module 1052 also generates a plurality of spelling suggestions using an existing spell-checking algorithm that compares the non-standard token to the standard tokens 124 in the dictionary data 1018 and identifies suggestions from the standard tokens 124 based on the comparison.

Process 1300 continues as the controller 104 selects up to a predetermined number of N candidate tokens using a noisy channel model to select the N candidate tokens with the highest score from the CRF feature transformation module (block 1320), the visual similarity suggestion module (block 1324), and the spell checker (block 1328). The noisy channel model selects standard tokens $s_i$ from the set of candidate standard tokens based on a maximization process for the conditional probability that the standard token $s_i$ is identified given the non-standard token $t_i$ as set forth in the following equations: $\hat{s} = \arg\max p(s_i | t_i) = \arg\max(p(t_i | s_i)p(s_i))$. The "arg max" function selects the candidate token $s_i$ with the maximum probability $p(s_i | t_i)$ from the set of identified candidate tokens. In one embodiment of the process 1300, the term $p(s_i | t_i)$ is not known directly, but the second equation includes the terms $p(t_i | s_i)$ and $p(s_i)$. The term $p(t_i | s_i)$ is also the score that is identified for each candidate token that is selected using the CFR feature transformation method or visual similarity method as described above. In the system 1000, the CRF score 1026 and visual similarity score 1028 that are stored in the memory 120 correspond to the term $p(t_i | s_i)$. Additionally, existing spell checking techniques use the noisy channel model and generate the probability $p(t_i | s_i)$. The term $p(s_i)$ represents the probability of the standard token appearing in the text corpus data 136, and the controller 104 identifies $p(s_i)$ as the ratio of the number of occurrences of si in the text corpus data 136 to the total number of tokens in the text corpus data 136. The second equation $\arg\max(p(t_i | s_i)p(s_i))$ is a modification of the well-known Bayes' theorem where the divisor $p(t_i)$ is omitted because each one of the candidate tokens is divided by the $p(t_i)$ term and the noisy channel model does not require the precise value of the probability term $p(s_i | t_i)$. In one embodiment, the controller 104 identifies the N candidate standard tokens by identifying the candidate standard token with the highest noisy channel score, removing the candidate standard token from the set of candidate standard tokens, and then repeating the noisy channel maximization process with the remaining candidate tokens in an iterative manner to identify the N candidate tokens. In embodiments of the process 1300, the controller 104 identifies N=20 standard tokens for each of the CRF feature transformation, visual similarity, and spell checking candidate standard tokens.

In one operating mode for the process 1300, the suggestion aggregation module 1056 is configured to generate an output including each of the N identified candidate standard tokens that are identified using each of the CRF feature transformation module 1044, visual similarity suggestion module 1048, and the spell checker module 1052 (block 1332). The system 1000 presents the N candidate standard tokens to the user with the user interface device (block 1336). In one configuration, the user interface and display device 1060 presents a graphical list including the N identified standard tokens in association with the non-standard token, and the user selects one of the standard tokens from the list using an input device. The controller 104 replaces the non-standard token with the selected standard token and displays the selected standard token to the user. In another configuration, the speech synthesis module 108 generates an audible output with speech synthesized versions of one or more of the identified standard tokens. The user optionally enters an input command with the user interface input device 1060 to identify one of the speech synthesized standard tokens to use in place of the non-standard token.

In another configuration of the process 1300, the controller 104 is configured to generate an output with only a limited number M of the N identified candidate standard tokens generated from each of the CRF feature transformation module 1044, visual similarity suggestion module 1048, and the spell checker module 1052 (block 1332). The process 1300 continues with generation of rankings of candidate standard tokens that are identified from the CRF feature transformation process or from the spell checker process, with the ranking made with reference to the noisy channel model score associated with each candidate token for candidate tokens having a noisy model channel score above a predetermined threshold (block 1340). For example, if the standard token with the highest noisy channel model score is one of the N candidate tokens that is generated using the CRF feature transformation module 1044, then the controller 104 assigns the identified CRF feature transformation model token the highest rank. If the next highest noisy channel model score corresponds to a candidate token that is identified by the spell checker module 1052, then the controller 104 selects the token from the spell checker module as the next highest ranked token for output.

During process 1300, the controller 104 generates up to M output tokens. For some non-standard tokens, the number of candidate tokens from the CRF feature transformation module 1044 and the spell checker module 1052 that exceed the predetermined noisy channel model threshold is less than the M total candidate token count. The controller 104 adds additional candidate tokens from the visual similarity module 1048 to generate an output of M candidate tokens (block 1344). In one configuration of the process 1300, the controller 104 selects candidate the candidate tokens that are identified by the visual similarity module 1048 beginning with the candidate tokens in order starting with the candidate token with the highest corresponding noisy channel score. In one embodiment, the controller 104 selects a single candidate token (M=1), which the controller 104 identifies as the candidate with the maximum associated noisy channel score from either the CRF feature transformation module 1044 or the spell checker 1052. If the identified candidate token does not exceed the predetermined noisy channel score threshold, then the controller 104 selects the single token with the highest noisy channel score from the visual similarity suggestion module 1048.

In one configuration of the process 1300, the system 1000 is configured to generate an output for the non-standard token individually instead of in the context of a larger text message that includes the non-standard token (block 1348). In the individual token output mode, the controller 104 presents the identified standard tokens to the user with the user interface and display device 1060 including one or more of the M identified standard tokens in the ranked order made with reference to the noisy channel model scores for the standard tokens in descending order from the standard token with the highest noisy channel score to the standard token with the lowest noisy channel score (block 1352). In one configuration, the user interface and display device 1060 generates a graphical list including the M identified standard tokens in association with the non-standard token, with the standard tokens having the highest noisy channel score being displayed at the top of the list. The user selects one of the standard tokens from the list using an input device to replace the non-standard token. In another embodiment, the controller 104 selects the standard token with the highest noisy channel score and presents the selected standard token to the user as a replacement for the non-standard token. The controller 104 replaces the non-standard token with the selected standard token and displays the selected standard token to the user. In another operating mode the controller 104 generates an audible speech synthesis output for the M standard tokens using the speech synthesis module 108 in order with the speech synthesis module 108 generating an audible output of the standard tokens with the highest noisy-channel scores first.

In another configuration of the process 1300, the system 1000 identifies one or more of the M selected standard tokens for output using context data from the communication message that includes the non-standard token (block 1348). For example, the text message "He says thnx for the new shoes," includes the non-standard token "thnx" in context with standard English word tokens in a phrase. The controller 104 performs a Viterbi decoding process for the non-standard token "thnx" using the context that is provided by the other tokens in the message and the language model data 1040 in the memory 1020 (block 1356). As described above, the language model data 1040 include a bigram or trigram language model for a given language, such as English, that corresponds to the standard tokens used in communication messages. The controller 104 applies the Viterbi decoding process using each of the M candidate tokens to identify a corresponding posterior probability corresponding to a likelihood that the given candidate token belongs in the context of the larger communication message. For example, for the candidate tokens "thanks" and "thinks," the controller 104 applies the Viterbi decoding process to the text in the communication message using the language model data 1040 to identify posterior probability values that the non-standard token "thnx" corresponds to either one of the candidate tokens given the context of the surrounding communication message.

In the system 1000, the controller 104 presents one or more of the M identified standard tokens to the user with the user interface devices in an order that is based on the ranking of posterior probabilities that are identified in the Viterbi decoding process for the text including the non-standard token (block 1360). In one embodiment, the system 1000 presents a visual output of the text in the messages with the display device 1060 that includes the selected standard token with the highest Viterbi probability used as a replacement for the non-standard token. In another configuration, the speech synthesis module 108 generates an audible output including a speech synthesis output for the selected standard token having the highest identified posterior probability in the Viterbi decoding process as a replacement for the non-standard token. In some configurations, the output of the Viterbi decoding process produces a different ranking for the M standard tokens than the order that is originally generated from the noisy channel scores for each of the M tokens. The Viterbi decoding process introduces text context to the standard token suggestion process using multiple forms of suggestion, while the noisy channel scores enable identification of the most likely standard tokens to replace a non-standard token in the absence of additional context.

The process 1300 enables the system 1000 to identify standard tokens in text data that correspond to non-standard tokens using a broad coverage process that identifies suggested standard tokens for the non-standard token using multiple methods instead of using a single identification method. An accurate identification occurs when the system 1000 presents one or more of the identified standard tokens with the highest noisy channel scores to the user and the user identifies that one of the standard tokens is the accurate replacement for the non-standard token. In one embodiment using text corpus data 136 that include messages transmitted using the Twitter social networking service, the broad coverage process 1300 identifies the contextually correct standard token in a set of one or more suggested standard tokens as set forth in Table 2:

TABLE 2

Broad Coverage Standard Token Suggestion Accuracy

| Twitter Dataset (3802 pairs) | ACCURACY OF STANDARD TOKEN SUGGESTIONS (%) | | | | |
|---|---|---|---|---|---|
| | 1-Best | 3-Best | 10-Best | 20-Best | Oracle (N identified standard tokens from all modules A-C) |
| A. Spell Checker Module | 47.19 | 56.92 | 59.13 | 59.18 | n/a |
| B. Visual Similarity Module | 54.34 | 70.59 | 80.83 | 84.74 | n/a |
| C. Feature Transformation Module | 61.05 | 70.07 | 74.04 | 74.75 | n/a |
| Broad Coverage Noisy-Channel Output from A-C | 69.81 | 82.51 | 92.24 | 93.79 | 95.71 |

It will be appreciated that variants of the above-disclosed and other features and functions, or alternatives thereof, may be desirably combined into many other different systems, applications or methods. For example, while the foregoing embodiments are configured to use standard tokens corresponding to English words, various other languages are also suitable for use with the embodiments described herein. Various presently unforeseen or unanticipated alternatives, modifications, variations or improvements may be subsequently made by those skilled in the art that are also intended to be encompassed by the following claims.

What is claimed is:

1. A method of selecting data for an automated training process comprising:
    identifying a plurality of occurrences of a non-standard token in a text corpus stored in a memory;
    identifying a first plurality of tokens in the text corpus that are located proximate to at least one of the occurrences of the non-standard token;
    identifying a plurality of occurrences of a candidate standard token in the text corpus;
    identifying a second plurality of tokens in the text corpus that are located proximate to at least one of the occurrences of the candidate standard token;
    identifying a contextual similarity between the first plurality of tokens and the second plurality of tokens;
    generating a statistical model for correction of non-standard tokens with the non-standard token in association with the standard token for generation of a statistical model only in response to the identified contextual similarity being greater than a predetermined threshold; and
    storing the generated statistical model in the memory for use in identification of another standard token that corresponds to another non-standard token identified in text data that are not included in the text corpus.

2. The method of claim 1, the identification of the contextual similarity further comprising:
    identifying a first weight vector including a first plurality of weights with each weight in the first plurality of weights being an identified weight for one token in the first plurality of tokens;
    identifying a second weight vector including a second plurality of weights with each weight in the second plurality of weights being an identified weight for one token in the second plurality of tokens;
    identifying a sum of products of the first plurality of weights in the first weight vector multiplied by corresponding weights in the second plurality of weights in the second weight vector;
    identifying a first square root of a sum of squared values of the first plurality of weights in the first weight vector;
    identifying a second square root of a sum of squared values of the second plurality of weights in the second weight vector; and
    identifying the contextual similarity with reference to the identified sum divided by a product of the first square root multiplied by the second square root.

3. The method of claim 2, the identification of one weight in the first plurality of weights for one token in the first plurality of tokens further comprising:
    identifying a first number of occurrences of the one token in the text corpus in a location that is proximate to the non-standard token;
    identifying a total number of occurrences of the one token in the text corpus;
    identifying a number of messages in the text corpus that include at least one occurrence of the one token; and
    identifying the one weight in the first plurality of weights for the one token in the first plurality of tokens with reference to a product of a ratio of the first number of occurrences of the one token to the total number of occurrences of the first token multiplied by a logarithm of a ratio of a predetermined total number of messages in the text corpus to the identified number of messages in the text corpus that include the at least one occurrence of the one token.

4. The method of claim 1, the generation of the statistical model further comprising:
    generating a conditional random field (CRF) model with the non-standard token in association with the standard token only in response to the identified contextual similarity being greater than a predetermined threshold.

5. The method of claim 1, the generation of the statistical model further comprising:
    generating a Hidden Markov Model (HMM) with the non-standard token in association with the standard token only in response to the identified contextual similarity being greater than a predetermined threshold.

6. A method of identifying a standard token in a dictionary that corresponds to a non-standard token identified in data including a plurality of text tokens comprising:
    identifying a candidate token in a plurality of standard tokens stored in a memory;
    identifying a longest common sequence (LCS) of features in the candidate token corresponding to at least one feature in the candidate token that is present in the non-standard token;
    identifying a number of features in the LCS;
    identifying a frequency of the candidate token in a text corpus stored in a memory;
    identifying a similarity score between the non-standard token and the standard token with reference to a ratio of the identified number of features in the LCS to a total number of features in the non-standard token multiplied by a logarithm of the identified frequency of the candidate token; and
    presenting with a user interface device the standard candidate token to a user in replacement of the non-standard token or in association with the non-standard token in response to the identified similarity score exceeding a predetermined threshold.

7. The method of claim 6, the identification of the frequency of the candidate token in the text corpus further comprising:
    identifying the frequency with reference to a total number of occurrences of the candidate token in the text corpus.

8. The method of claim 6, the identification of the longest common sequence of features further comprising:
    identifying a common series of characters that are included in the non-standard token and in the candidate token.

9. The method of claim 6, the identification of the candidate token further comprising:
    identifying a first character in one standard token in the plurality of standard tokens stored in the memory;
    identifying a first character in the non-standard token; and
    selecting the one standard token as the candidate token only in response to the first character in the one standard token corresponding to the first character in the non-standard token.

10. A method of identifying a plurality of standard tokens that correspond to a non-standard token comprising:
    identifying a first standard token corresponding to the non-standard token, the standard token being included in a dictionary having a plurality of standard tokens stored in a memory, the identification of the first standard token being made through transformation of a first plurality of features in the first standard token into a corresponding second plurality of features in the non-standard token using a conditional random field (CRF) model;
    identifying a second standard token in the dictionary of standard tokens corresponding to the non-standard token, the identification of the second standard token being made with reference to a comparison of the non-standard token with the standard tokens stored in the dictionary;

identifying a first noisy channel score for the first standard token with reference to a first conditional probability value and a probability of the first standard token occurring in a text corpus stored in the memory, the first conditional probability value corresponding to the first standard token given the non-standard token from the CRF model;

identifying a second noisy channel score for the second standard token with reference to a second conditional probability value and a probability of the second standard token occurring in the text corpus, the second conditional probability value corresponding to the second standard token given the non-standard token from the comparison;

presenting with a user interface device the first standard token to a user in replacement of the non-standard token or in association with the non-standard token in response to the first noisy channel score being greater than the second noisy channel score; and presenting with the user interface device the second standard token to the user in replacement of the non-standard token or in association with the non-standard token in response to the second noisy channel score being greater than the first noisy channel score.

11. The method of claim 10 further comprising:
presenting with the user interface device the first standard token and the second standard token to the user in association with the non-standard token, the first standard token and the second standard token being presented in a descending order with the first standard token being displayed first in response to the first noisy channel score being higher than the second noisy channel score and the second standard token being displayed first in response to the second noisy channel score being higher than the first noisy channel score.

12. The method of claim 11 further comprising:
identifying a third standard token corresponding to the non-standard token, the identification of the third standard token further comprising:
 identifying a first similarity score with reference to a ratio of a longest common sequence (LCS) of features between the third standard token and the non-standard token to a total number of features in the non-standard token multiplied by a logarithm of a number of occurrences of the third standard token in the text corpus;

identifying a fourth standard token corresponding to the non-standard token, the identification of the fourth standard token further comprising:
 identifying a second similarity score with reference to a ratio of a longest common sequence (LCS) of features between the fourth standard token and the non-standard token to a total number of features in the non-standard token multiplied by a logarithm of a number of occurrences of the fourth standard token in the text corpus;

presenting with the user interface device the third standard token to the user in association with or in replacement of the non-standard token in response to the first similarity score exceeding the second similarity score; and presenting with the user interface device the fourth standard token to the user in association with or in replacement of the non-standard token in response to the second similarity score exceeding the first similarity score.

13. The method of claim 11 further comprising:
identifying a plurality of tokens in a message including the non-standard token;

applying a Viterbi decoding process to the plurality of tokens in the message using a predetermined language model corresponding to a language of the message with the first standard token used in place of the non-standard token to identify a first posterior probability of the first standard token in the message;

applying the Viterbi decoding process to the plurality of tokens in the message using the predetermined language model corresponding to the language of the message with the second standard token used in place of the non-standard token to identify a second posterior probability of the first standard token in the message;

presenting to the user with the user interface device the message with the first standard token used as a replacement for the non-standard token in response to the first posterior probability being greater than the second posterior probability; and presenting to the user with the user interface device the message with the second standard token used as a replacement for the non-standard token in response to the second posterior probability being greater than the first posterior probability.

\* \* \* \* \*